(12) United States Patent
Deng et al.

(10) Patent No.: US 12,144,016 B2
(45) Date of Patent: Nov. 12, 2024

(54) METHODS FOR NR SL MULTI-SUB-CHANNEL PSCCH TRANSMISSION

(71) Applicant: INTERDIGITAL PATENT HOLDINGS, INC., Wilmington, DE (US)

(72) Inventors: Tao Deng, Roslyn, NY (US); Moon-il Lee, Melville, NY (US); Martino Freda, Laval (CA); Tuong Hoang, Montreal (CA); Chunxuan Ye, San Diego, CA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 377 days.

(21) Appl. No.: 17/432,773

(22) PCT Filed: Feb. 21, 2020

(86) PCT No.: PCT/US2020/019296
§ 371 (c)(1),
(2) Date: Aug. 20, 2021

(87) PCT Pub. No.: WO2020/172576
PCT Pub. Date: Aug. 27, 2020

(65) Prior Publication Data
US 2022/0159674 A1    May 19, 2022

Related U.S. Application Data

(60) Provisional application No. 62/909,022, filed on Oct. 1, 2019, provisional application No. 62/886,505, filed on
(Continued)

(51) Int. Cl.
*H04W 72/543* (2023.01)
*H04W 72/044* (2023.01)
(Continued)

(52) U.S. Cl.
CPC ....... *H04W 72/543* (2023.01); *H04W 72/044* (2013.01); *H04W 72/20* (2023.01); *H04W 72/23* (2023.01); *H04W 72/566* (2023.01)

(58) Field of Classification Search
CPC . H04W 72/543; H04W 72/044; H04W 72/20; H04W 72/23; H04W 72/566; H04W 72/02; H04W 76/14; H04L 5/0053
(Continued)

(56) References Cited

U.S. PATENT DOCUMENTS

| 10,624,076 B2 | 4/2020 | Kim et al. |
| 10,779,308 B2 | 9/2020 | Patil et al. |

(Continued)

FOREIGN PATENT DOCUMENTS

| CN | 107277922 B | 6/2024 |
| WO | 2017172789 A1 | 10/2017 |
| WO | 2018219436 A1 | 12/2018 |

OTHER PUBLICATIONS

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
(Continued)

*Primary Examiner* — Rownak Islam
(74) *Attorney, Agent, or Firm* — Volpe Koenig

(57) ABSTRACT

Methods and apparatuses for Sidelink (SL) communication are disclosed herein. A method for SL communication performed by a Wireless Transmit/Receive Unit (WTRU) may comprise determining to transmit Sidelink Control Information (SCI) over a Physical Sidelink Control Channel (PSCCH). The method may further comprise selecting one
(Continued)

or more sub-channels from a Physical Sidelink Shared Channel (PSSCH) in which to allocate time and frequency resources for the PSCCH. The method may further comprise allocating time and frequency resources within the PSCCH in which to transmit the SCI. The allocation of time and frequency resources may be based on at least one of an SCI format type, a Layer 1 (L1) Identifier (ID), a priority, or a Quality of Service (QoS) requirement. The method may further comprise transmitting the SCI over the determined time and frequency resources.

16 Claims, 9 Drawing Sheets

Related U.S. Application Data on Aug. 14, 2019, provisional application No. 62/809,317, filed on Feb. 22, 2019.

(51) Int. Cl.
*H04W 72/20* (2023.01)
*H04W 72/23* (2023.01)
*H04W 72/566* (2023.01)

(58) Field of Classification Search
USPC .......................................................... 370/330
See application file for complete search history.

(56) References Cited

U.S. PATENT DOCUMENTS

| | | | |
|---|---|---|---|
| 11,026,271 | B2 | 6/2021 | Chae et al. |
| 2017/0188391 | A1 | 6/2017 | Rajagopal et al. |
| 2017/0289733 | A1 | 10/2017 | Rajagopal et al. |
| 2018/0124682 | A1 | 5/2018 | Chae et al. |
| 2018/0206260 | A1 | 7/2018 | Khoryaev et al. |
| 2018/0213438 | A1 | 7/2018 | Muraoka et al. |
| 2020/0296690 | A1* | 9/2020 | Lee .................... H04W 4/40 |
| 2021/0385842 | A1* | 12/2021 | Zhao ................... H04L 5/0053 |
| 2022/0078664 | A1* | 3/2022 | Mok .................... H04L 1/08 |
| 2022/0150032 | A1* | 5/2022 | Lee ..................... H04L 5/0007 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

MCC Support, "Final Report of 3GPP TSG RAN WG1 #94bis v1.0.0 (Chengdu, China, Oct. 8-12, 2018)," 3GPP TSG RAN WG1 Meeting #95, R1-1812101, Spokane, USA (Nov. 12-16, 2018).

Third Generation Partnership Project, "Technical Specification Group Services and System Aspects; System Architecture for the 5G System; Stage 2 (Release 15)," 3GPP TS 23.501 V15.4.0 (Dec. 2018).

Third Generation Partnership Project, "Technical Specification Group Services and System Aspects; System architecture for the 5G System (5GS); Stage 2 (Release 16)," 3GPP TS 23.501 V16.3.0 (Dec. 2019).

Third Generation Partnership Project, "Technical Specification Group Services and System Aspects; System architecture for the 5G System (5GS); Stage 2 (Release 15)," 3GPP TS 23.501 V15.8.0 (Dec. 2019).

Third Generation Partnership Project, "Technical Specification Group Services and System Aspects; System Architecture for the 5G System; Stage 2 (Release 16)," 3GPP TS 23.501 V16.1.0 (Jun. 2019).

Third Generation Partnership Project, "Technical Specification Group Radio Access Network; Study on evaluation methodology of new Vehicle-to-Everything V2X use cases for LTE and NR; (Release 15)," 3GPP TR 37.885 V1.0.0 (May 2018).

Third Generation Partnership Project, "Technical Specification Group Radio Access Network; Study on evaluation methodology of new Vehicle-to-Everything (V2X) use cases for LTE and NR; (Release 15)," 3GPP TR 37.885 V15.3.0 (Jun. 2019).

Third Generation Partnership Project, "Technical Specification Group Radio Access Network; Study on evaluation methodology of new Vehicle-to-Everything (V2X) use cases for LTE and NR; (Release 15)," 3GPP TR 37.885 V15.2.0 (Dec. 2018).

Third Generation Partnership Project, "Technical Specification Group Radio Access Network; Study on Scenarios and Requirements for Next Generation Access Technologies; (Release 14)," 3GPP TR 38.913 V14.1.0 (Dec. 2016).

Third Generation Partnership Project, "Technical Specification Group Radio Access Network; Study on Scenarios and Requirements for Next Generation Access Technologies; (Release 15)," 3GPP TR 38.913 V15.0.0 (Jun. 2018).

* cited by examiner

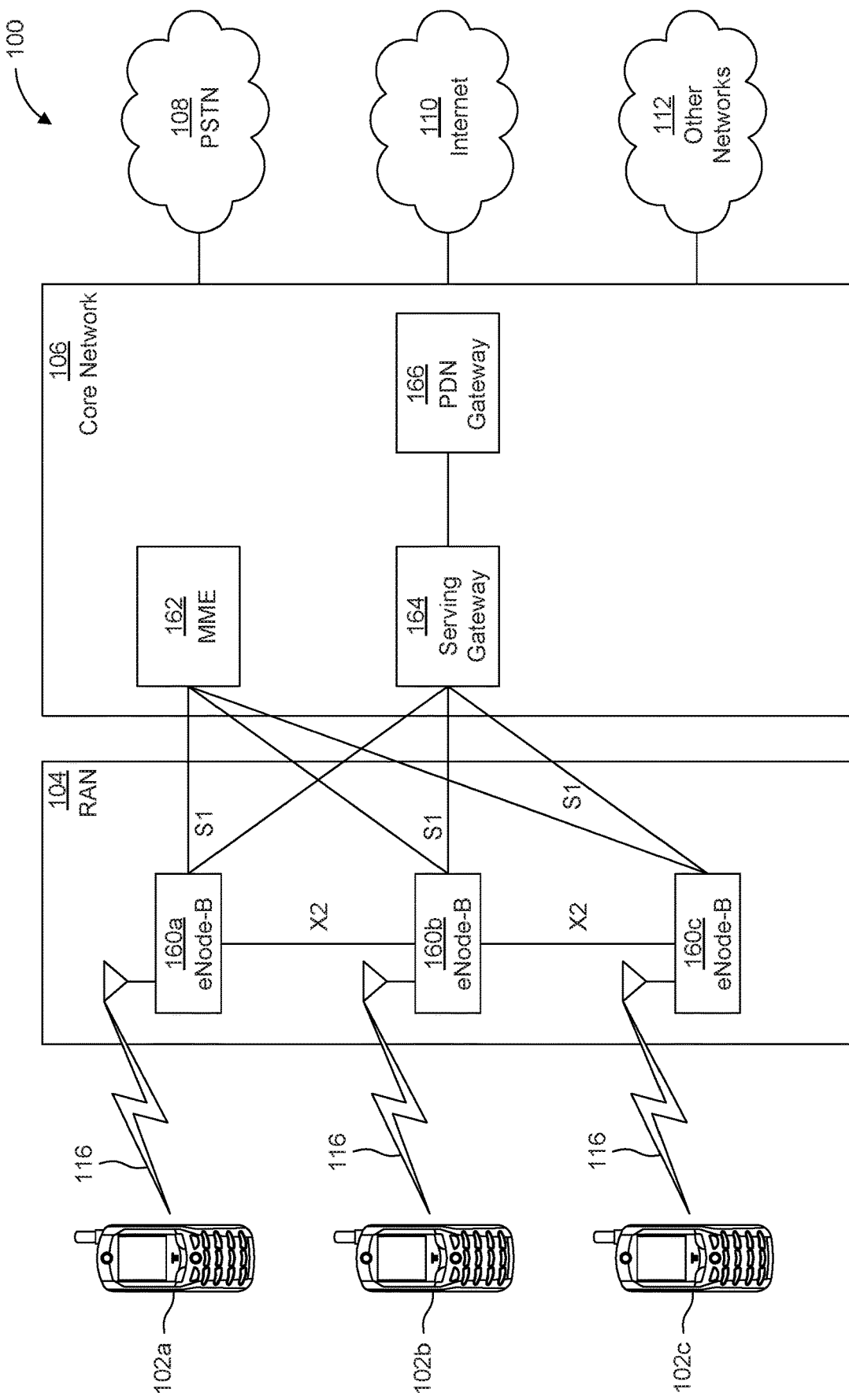

METHODS FOR NR SL MULTI-SUB-CHANNEL PSCCH TRANSMISSION

CROSS-REFERENCE TO RELATED APPLICATIONS

This application is the U.S. National Stage, under 35 U.S.C. § 371, of International Application No. PCT/US2020/019296, filed Feb. 21, 2020, which claims the benefit of U.S. Provisional Application No. 62/909,022, filed Oct. 1, 2019, U.S. Provisional Application No. 62/886,505, filed Aug. 14, 2019, and U.S. Provisional Application No. 62/809,317, filed Feb. 22, 2019, the contents of which are incorporated herein by reference.

BACKGROUND

In 3GPP standards for Long-Term Evolution (LTE) wireless technologies, a vehicle-to-everything (V2X) channel bandwidth may be divided into a set of sub-channels, and the size of the sub-channel may be configured by the network. For example, the size may be 4, 5, 6, 8, 9, 10, 12, 15, 16, 18, 20, 25, 30, 48 or 50 Resource Blocks (RBs). An LTE V2X Wireless Transmit/Receive Unit (WTRU) may apply one or multiple sub-channels for transmission of a Physical Sidelink Shared Channel (PSSCH) transmission depending on parameters including the transport block (TB) size, the sub-channel configuration and/or Modulation and Coding Scheme (MCS). Due to the use of Discrete Fourier Transform-spread-Orthogonal Frequency Division Multiplexing (DFT-s-OFDM), in LTE, all sub-channels used for one PSSCH must be consecutive.

The associated PSCCH is transmitted in the same subframe and is frequency division multiplexed (FDMed) with the PSSCH. The network may signal two configurations of a PSSCH and one or more associated PSCCH transmissions. One is an adjacent Physical Sidelink Control Channel (PSCCH) and PSSCH transmission. The PSSCH and its associated PSCCH are transmitted in adjacent RBs and in this case the PSCCH is transmitted in the first two RBs of the sub-channel with the lower index used for the PSSCH. The other configuration is a non-adjacent arrangement of PSCCH and PSSCH transmissions. The PSSCH is transmitted in sub-channels and its associated PSCCH is transmitted in a separate pool located at one edge of the channel. It should be noted that a PSCCH in the non-adjacent configuration occupies two RBs.

For NR V2X, cyclic prefix OFDM (CP-OFDM) is supported and as a result, non-contiguous NR PSSCH frequency resource allocation may become feasible. The NR PSSCH resource allocation is based on sub-channel and a set of multiplexing configurations between PSSCH and associated PSCCH. Both TDM and FDM configurations are currently being considered for NR V2X. In one Time-Division Multiplexing (TDM) configuration, PSCCH and the associated PSSCH are transmitted using non-overlapping time resources and the frequency resources used by the two channels are either the same or different. In another TDM configuration, a part of the PSCCH and the associated PSSCH are transmitted using overlapping time resources in non-overlapping frequency resources, but another part of the associated PSSCH and/or another part of the PSCCH are transmitted using non-overlapping time resources.

In LTE V2X, broadcast transmission and periodic traffic patterns are supported with transmission packet sizes varying from between 50-300 bytes. However, NR V2X supports a set of advanced use cases with widely different traffic patterns and associated QoS requirements. Certain NR V2X use cases have significantly larger packet size and lower latency that LTE requirements, for example, a NR V2X packet size may be between 30,000 and 60,000 bytes and latency may be as low as 3 ms. Also, in addition to broadcast transmission, NR V2X adds support for unicast and multicast transmissions that may require high reliability and link adaptation of both NR PSCCH becomes important. Therefore, to deliver the high capacity and reliability as well as low latency required for various types of NR V2X transmission, the NR PSCCH design may address certain aspects.

SUMMARY

Methods and apparatuses for Sidelink (SL) communication are disclosed herein. A method for SL communication performed by a Wireless Transmit/Receive Unit (WTRU) may comprise determining to transmit Sidelink Control Information (SCI) over a Physical Sidelink Control Channel (PSCCH). The method may further comprise selecting one or more sub-channels from a Physical Sidelink Shared Channel (PSSCH) in which to allocate time and frequency resources for the PSCCH. The method may further comprise allocating time and frequency resources within the PSCCH in which to transmit the SCI. The allocation of time and frequency resources may be based on at least one of an SCI format type, a Layer 1 (L1) Identifier (ID), a priority, or a Quality of Service (QoS) requirement. The method may further comprise transmitting the SCI over the determined time and frequency resources.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 10 is a system diagram illustrating an example radio access network (RAN) and an example core network (CN) that may be used within the communications system illustrated in FIG. 1A according to an embodiment;

DETAILED DESCRIPTION

Figure 1A:
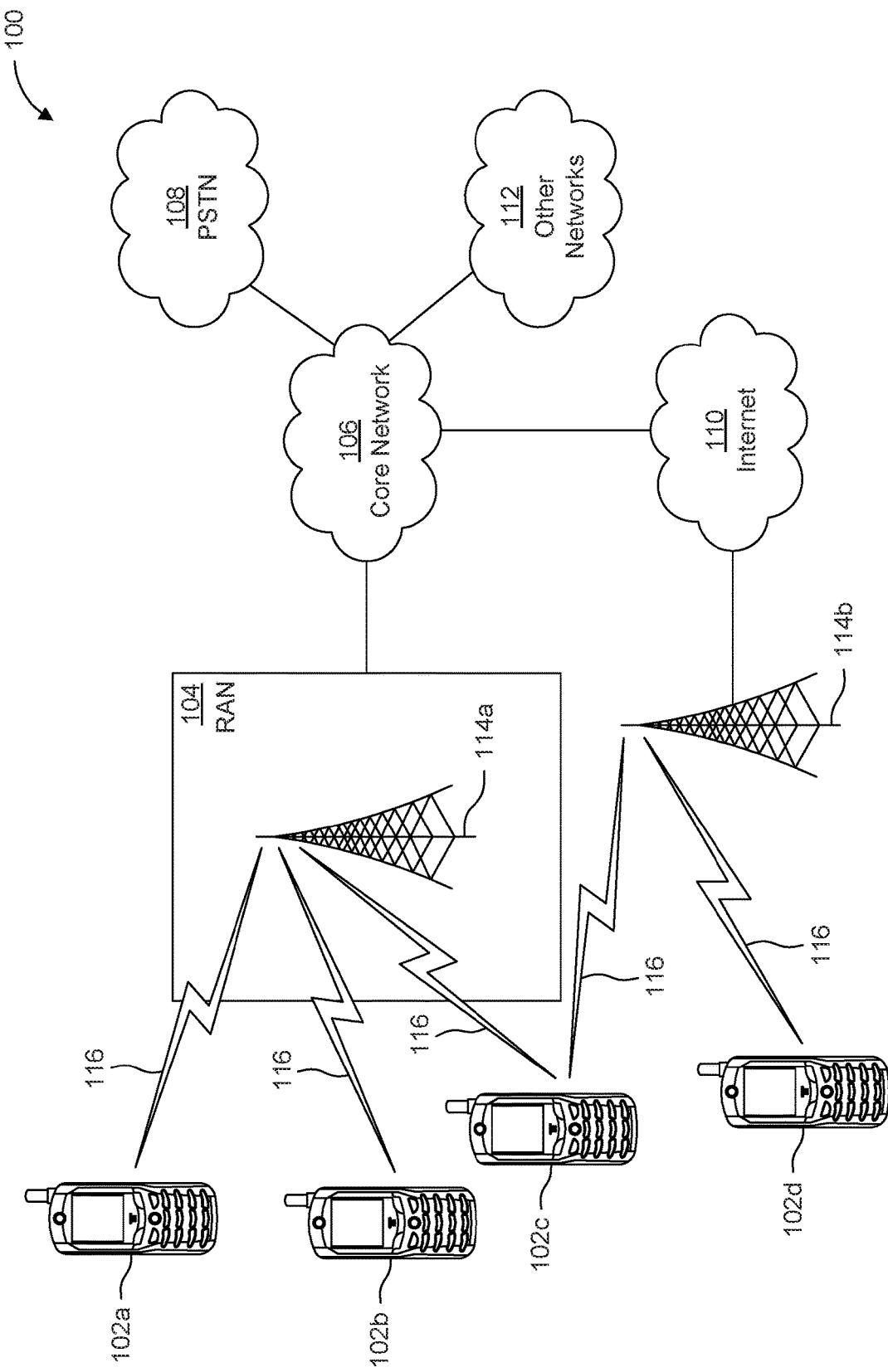
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
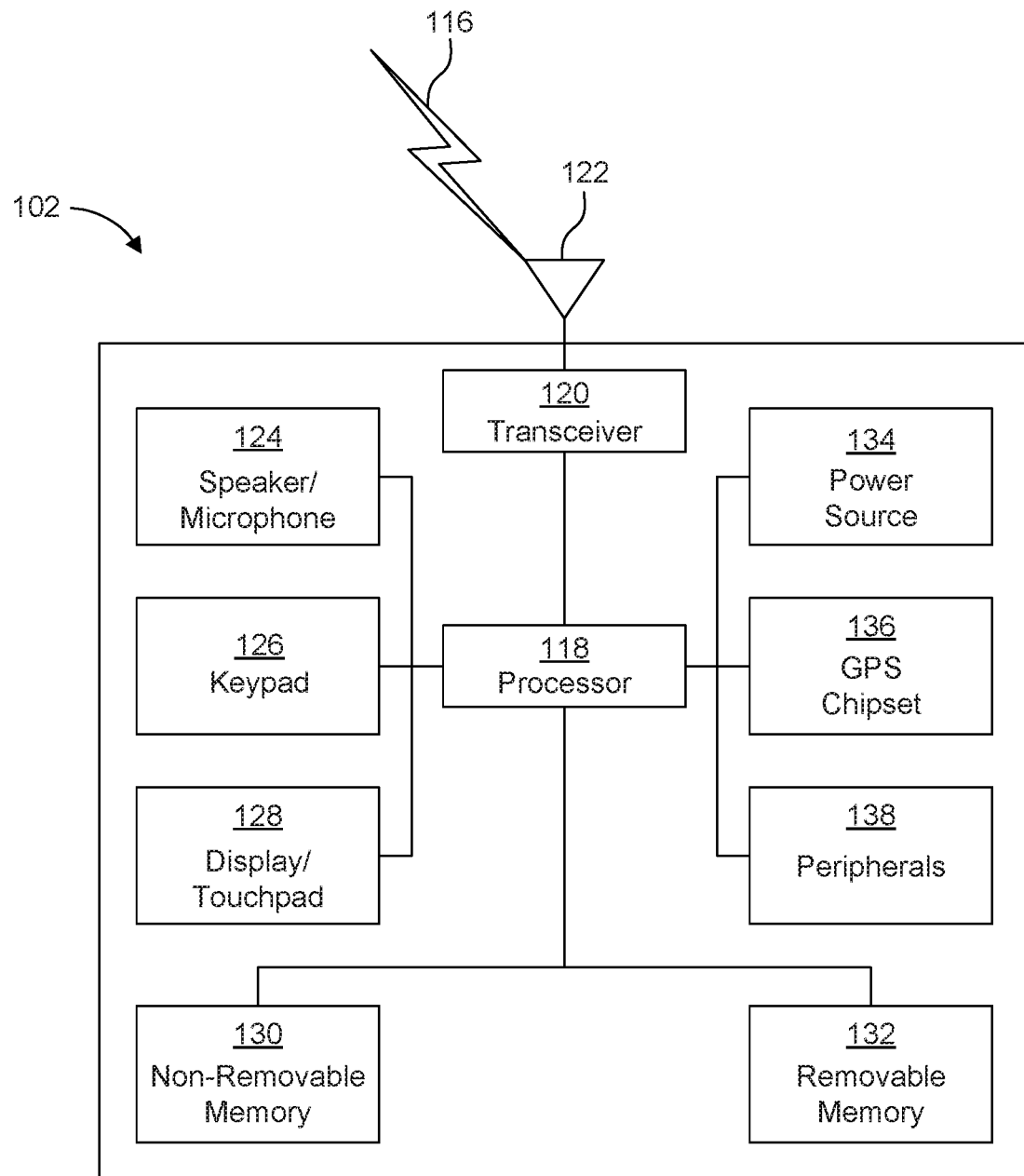
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
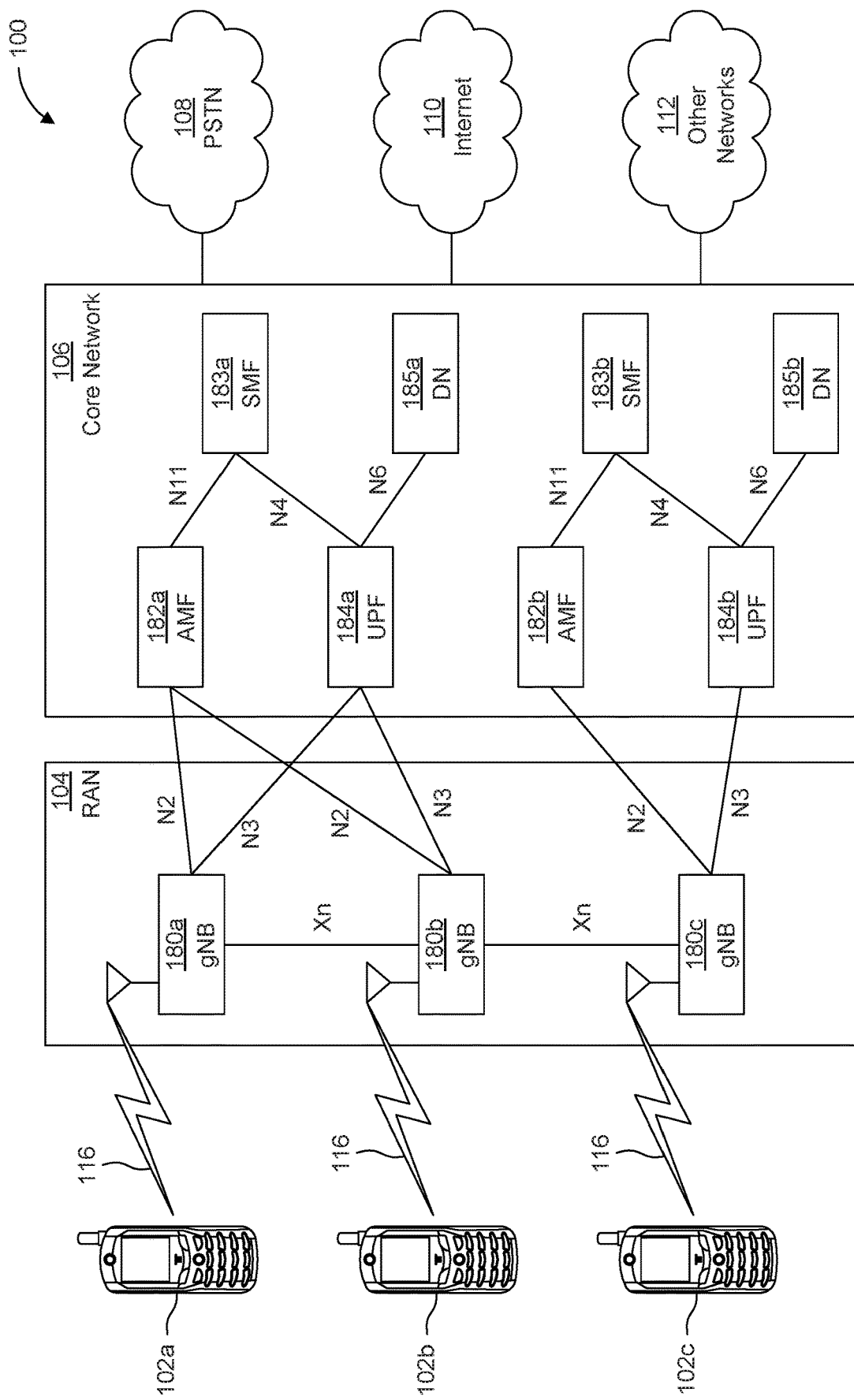
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In LTE V2X, broadcast transmission and periodical traffic pattern is supported with transmission packet sizes varying between 50-300 bytes. However, NR V2X supports a set of advanced use cases with widely different traffic patterns and associated Quality of Service (QoS) requirements. Certain NR V2X use cases may employ significantly larger packet sizes and require lower latencies than LTE scenarios. For example, an NR V2X packet size may be between 30000 and 60000 bytes and a latency may be as low as 3 ms. Also, in addition to broadcast transmission, NR V2X adds support for unicast and multicast transmissions that may require high reliability, and link adaptation of both NR PSCCH transmissions may become important. Therefore, to deliver high capacity and reliability as well as low latency required for various types of NR V2X transmission, the NR PSCCH design may address certain aspects of the existing LTE V2X design and proposed NR V2X designs.

For instance, LTE specifies a fixed amount of PSCCH time resources. LTE PSCCH resource allocation is always fixed with one sub-frame (14 symbols) and two RBs for a PSSCH transmission, and does not vary, for example, depending on the transmission type or QoS parameters. Such a fixed amount of PSCCH resources may not be able to meet the range of NR V2X QoS requirements and achieve high resource utilization efficiency. It may be necessary for NR PSCCH design to provide a flexible NR PSCCH resource configuration by which the total PSCCH resource may be varied in both frequency domain, e.g. number of RBs, and time domain, e.g. number of symbols occupied in one slot. Additionally, LTE specifies a fixed PSCCH frequency resource placement.

An LTE PSCCH frequency resource may be placed at the first two RBs of the sub-channel with the lowest sub-channel index allocated for the associated PSSCH transmission. With this allocation, a PSCCH does not take advantage of channel frequency diversity as the LTE and NR air interface (Uu) PDCCHs do. A NR PSSCH transmission may occupy a large amount of frequency resources due to potentially large TB sizes and, with the use of Cyclic Prefix Orthogonal Frequency Division Multiplexing (CP-OFDM) in NR V2X, the allocated PSSCH frequencies may be non-contiguous. As a result, NR V2X transmissions may have a high degree of frequency diversity to exploit for PSCCH, especially for large-TB transmissions.

Proposed NR PSCCH and PSSCH designs may require high signaling overhead due to use of time-division multiplexing for PSCCH and/or PSSCH transmissions. When a PSSCH transmission occupies non-contiguous frequency resources, such as a non-contiguous set of sub-channels, the TDM configuration currently discussed for NR V2X PSCCH/PSSCH multiplexing may entail use of a PSCCH transmission for each distinct set of PSSCH frequency resources. This may increase control channeling overhead, especially when the PSSCH transmission frequency resource allocation is fragmented.

Solutions for PSCCH resource determination are described herein. In particular, for sidelink (SL) transmissions, one or more SL resource pools may be used, configured, or determined. A resource pool may be a set of sub-channels used for a sidelink transmission. The term "resource pool" may be interchangeably used with "pool," "resource set," "sidelink resource pool," or "SL resource pool." One or more solutions may be applied when determining a sidelink resource pool.

For example, in some solutions, a set of sub-channels may be determined, defined, or used in a sidelink bandwidth part (BWP), wherein the number of sub-channels used for SL BWP may be determined based on one or more parameters. Such parameters may include a frequency band of the SL BWP (e.g., the number of RBs used for the SL BWP and/or numerology used), a numerology (e.g., subcarrier spacing), or a number of reserved resources (e.g., resource blocks (RBs) and/or symbols). The reserved RBs and/or symbols may be a number of RBs that fall within the SL BWP but are not used for sidelink transmission. The reserved resources (RBs, or symbols) may be referred to as rate matching resources.

In some solutions, one or more resource pools may be configured, and a resource pool may include one or more sub-channels. The associated sub-channels for a resource may be determined based on one or more parameters. Such parameters may include the number of resource pools configured. In one scenario, a number of sub-channels of a resource pool may be evenly distributed among the number of configured resource pools. For example, such sub-channel distribution may be expressed by N_subpool=floor(N_sub/N_pool), wherein N_subpool denotes the number of sub-channels per pool, N_sub denotes the number of sub-channels within a SL BWP, and N_pool denotes the number of pools configured for the SL BWP. The associated sub-channels for a resource may be determined by a higher layer configuration. For instance, for each resource pool configuration, a gNB may configure a set of sub-channels associated with the pool.

In one solution, one or more resource pools can be configured for a SL BWP, and one or more properties may be configured for each resource pool. One configured property for a resource pool may be a sub-channel configuration. The configuration may include, for instance, a set of sub-channels, or a PSCCH and PSSCH multiplexing scheme. For example, one or more PSCCH and PSSCH multiplexing schemes may be used, and the multiplexing scheme that is used or will be used may be indicated in the configuration. The PSCCH and PSSCH multiplexing schemes configured for each of the one or more resource pools may include, but are not limited to time-domain and/or frequency domain multiplexing. The configured properties for each resource pool may include one or more Quality of Service (QoS) thresholds. For example, if a QoS of a sidelink transmission is below the QoS threshold associated with a resource pool, a source WTRU may not use or may not be allowed to use the resource pool. If the QoS of the sidelink transmission is not below the QoS threshold, a source WTRU may transmit the PSCCH or PSSCH transmission using the resource pool. QoS parameters may include a PPPP (priority), a PPPR (reliability), and/or a range, and the threshold may be individually configured for each QoS parameter. In an example, if any one of QoS parameters does not exceed the threshold, a source WTRU may not be permitted to use the resource pool.

The configured properties for each resource pool may include one or more traffic types, for example, unicast, groupcast, or broadcast, and the traffic type may be determined based on one or more of an RNTI used to scramble CRC of an SCI for PSCCH; an SCI format; or the contents of an SCI. The configured properties for each resource pool may include one or more Demodulation Reference Signal (DM-RS) configurations for one or more PSCCH, PSSCH, and/or PSFCH transmissions, which may include a Type-1 mapping or Type-2 mapping, a DM-RS time, and/or a frequency density; or the configured properties for each resource pool may include a maximum Doppler frequency supported.

A maximum Doppler frequency D_max may be configured, and if a maximum Doppler frequency for a link, such as a relative Doppler frequency of two WTRUs is higher than the maximum, a source WTRU may not use or be allowed to use the resource pool. In some embodiments, the maximum Doppler frequency limitation or restriction may be only used for unicast traffic.

The configured properties for each resource pool may include a configuration enabling or disabling HARQ feedback. Alternatively, one or more physical sidelink feedback channels (PSFCHs) may be present in the resource pool or in a slot. The configured properties for each resource pool may dictate the mode of the resource pool. For example, if a sub-channel within the resource pool is configured with contiguous RBs, the resource pool may be configured for a localized mode. If a sub-channel within the resource pool is configured with non-contiguous RBs, the resource pool may be configured for a distributed mode. The configured properties for each resource pool may dictate whether the resource pool is a transmitter pool or resource pool, i.e. whether the resource pool is used for sidelink transmission or reception.

In solutions as described herein, a WTRU may determine one or more SL resources for PSCCH transmission. A sub-channel over which a PSCCH transmission may take place may be defined, determined, configured, or used based on one or more of a set of contiguous RBs (or non-contiguous) in a frequency within a carrier and/or a bandwidth part (BWP) or a set of contiguous or non-contiguous symbols within a slot, where a symbol may be a DFT-s-OFDM or CP-OFDM symbol.

A sub-channel over which a PSCCH transmission may take place may be defined, determined, configured, or used based on an associated DM-RS configuration, such as a type-1 DM-RS mapping or type-2 DM-RS mapping, and a DM-RS density in frequency and/or time may be different based on the associated DM-RS configuration.

A sub-channel over which a PSCCH transmission may take place may be defined, determined, configured, or used based on a scrambling sequence for a DM-RS, for instance, for a PSCCH, PSSCH, and/or PSFCH transmission), and the scrambling sequence may be initialized based on a sub-channel index.

Figure 2:
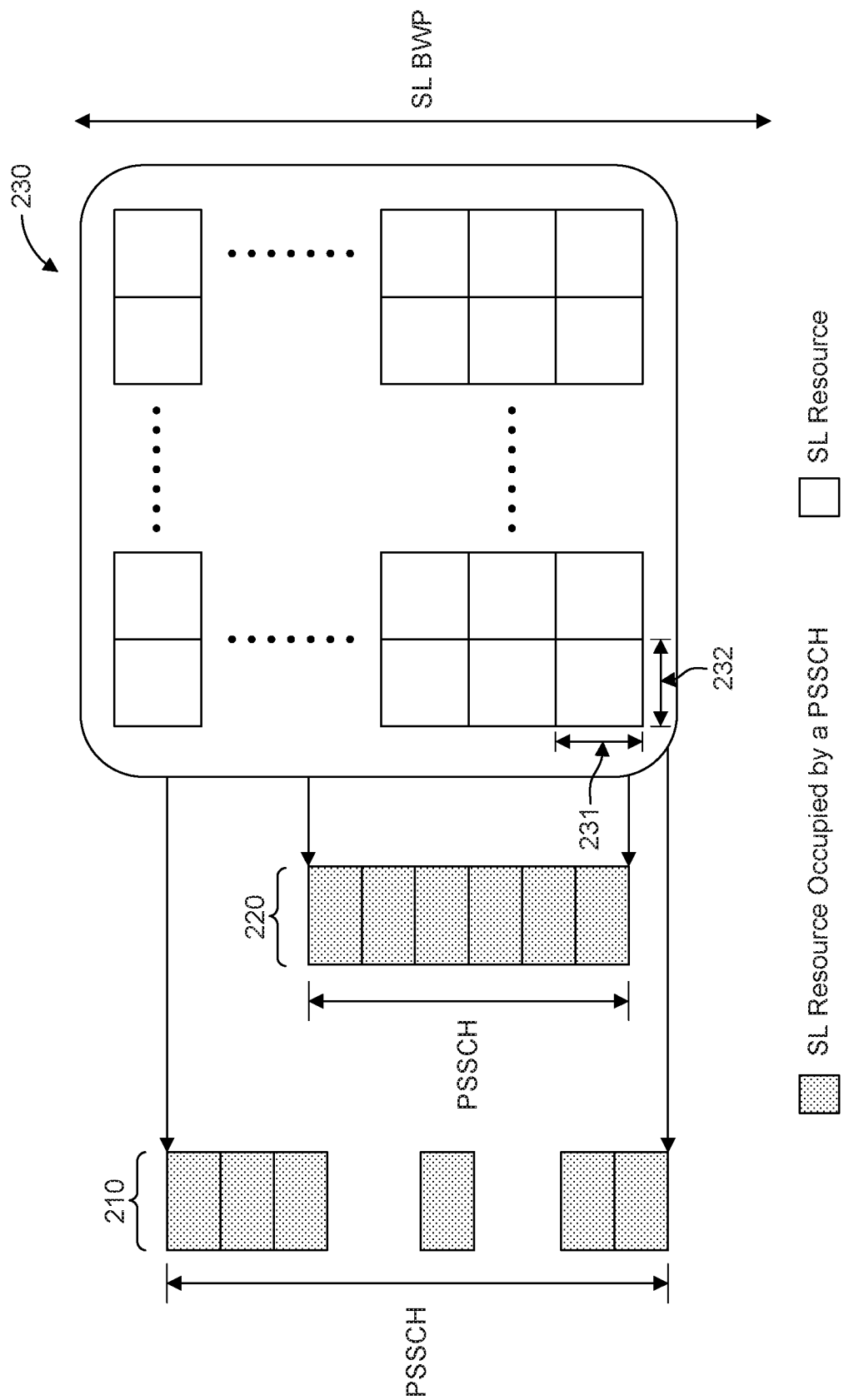
FIG. 2 provides an overview of a multi-sub-channel PSSCH transmission.

Solutions for determining the sub-channel for PSCCH transmission are described herein. FIG. 2 provides an overview of a multi-sub-channel PSSCH transmission. A WTRU may determine to apply a set of SL resources in one SL time resource, such as a slot of a PSSCH transmission within one SL TB, in which to transmit one SL TB. The selected SL resources may be contiguous or non-contiguous as shown in FIG. 2. In a contiguous PSSCH shown at 220, multiple consecutive sub-channels may be used. In a non-contiguous PSSCH shown at 210, sub-channels may be distributed within a SL resource pool 230, which may be defined with a particular bandwidth. A WTRU may determine the set of such SL resources based on the resource availability determined in the sensing process.

Among the PSSCH sub-channels, i.e., sub-channels determined for PSSCH transmission, a WTRU may determine one or more sets of PSSCH sub-channels from which to include PSCCH resources for the associated PSCCH transmission. For example, a sub-channel 231 may define frequency resources within the PSSCH over which to send a PSCCH transmission. An SL resource pool may additionally include defined SL time resources, 232. The sub-channel determination may include, for example, one PSSCH sub-channel for one associated PSCCH, which may be used for a one-stage SCI transmission; a set of PSSCH sub-channels for one associated PSCCH, which may be used for a one-stage SCI transmission; one PSSCH sub-channel for two associated PSCCHs, PSCCH_1 and PSCCH_2, which may be used for a two-stage SCI transmission; or a set of PSSCH sub-channels for two associated PSCCHs, PSCCH_1 and PSCCH_2, which may be used for a two-stage SCI transmission. In the last case, a WTRU may determine the sub-channels for PSCCH_1 and PSCCH_2 based on different rules or parameters.

Such parameters may include, for example, an SCI format type carried in the PSCCH, for example, unicast SCI, multicast SCI, or broadcast SCI, SCI containing WTRU-common information such as a first SCI in a two-stage SCI transmission, or SCI containing WTRU-specific information such as second SCI in a two-stage SCI transmission.

The parameters may include an SL BWP configuration; a PHY ID, which may be a Source ID, destination ID, or HARQ Process ID configured by higher layer; a Link ID, group ID, or service ID, any of which may provide a link index that a WTRU may use to distinguish multiple established unicast, multicast and broadcast transmissions, or a service ID that a WTRU may use to distinguish the broadcast transmission service to which it subscribes; an associated SL transmission QoS parameter, such as a priority, reliability, or latency and range; a sub-channel channel condition, which may be based wholly or partially on SL feedback information (CQI/PMI/RI), WTRU positioning information, WTRU mobility information, a Doppler estimate, channel reciprocity, LOS detection, or any combination thereof; or a beamforming configuration, such as a spatial domain transmission filtering configuration used for the PSCCH resource in a Frequency Range 2 (FR2) operation.

In some solutions, a WTRU may select a PSSCH sub-channel in which to include PSCCH resources based on a SCI format type.

For scheduling of a broadcast SCI transmission or a transmission of SCI containing WTRU-common information, a WTRU may select the PSSCH sub-channel having the lowest sub-channel index among both contiguous and non-contiguous PSSCH transmissions. In another solution, a WTRU may select a PSSCH sub-channel from the center of the frequency resources of a PSSCH transmission over which to transmit such SCIs.

From a resource pool, a WTRU may select a first set of sub-channels for a PSSCH transmission and the WTRU may select a second set of sub-channels for a PSCCH transmission. The PSCCH transmission may be associated with the PSSCH transmission, and may, for example, include scheduling information for the PSSCH. The second set of sub-channels may be a subset of the first set of sub-channels. One or more characteristics may apply to one or both of the first or second sets of sub-channels. The second set of sub-channels may be the sub-channel with a lowest or a highest sub-channel index, and the sub-channel index may be determined based on an increasing or decreasing order of sub-channels in the frequency domain. The second set of sub-channels may be determined based on one or more system parameters including, but not limited to, a slot number, a subframe number, a physical cell-ID, a carrier-ID, or a radio frame number such as an SFN. The second set of sub-channels may be determined based on the number of sub-channels selected, determined, used, or scheduled for the first set of sub-channels.

In another solution, one or more PSCCHs may be used to transmit scheduling information for a PSSCH transmission. A WTRU may select a first set of sub-channels to transmit scheduling information for a PSSCH transmission, and the WTRU may determine a second set of sub-channels for one or more PSCCH transmissions associated with the scheduled PSSCH. The WTRU may make such determination based on one or more criteria as disclosed herein.

For example, a sub-channel for a first PSCCH, which may be referred to as a PSCCH-1, may be determined based on a common parameter or parameters for a group of WTRUs. The common parameter or parameter may include, but is not limited to, a sub-channel-ID, or a first sub-channel-ID when multiple sub-channels are scheduled or used for PSSCH transmission; a set-ID of the first set of sub-channels, where one or more set-IDs may be used to schedule a transmission over a PSSCH having one or more sub-channels; or a slot number or subframe number.

In some embodiments, a sub-channel for a first PSCCH may be transmitted in a predetermined frequency location, which may be, for example, a set of RBs starting from the first RB within a first set of sub-channels.

In some embodiments, a sub-channel for a second PSCCH, which may be referred to as a PSCCH-2, may be determined based on one or more WTRU-specific parameters. Such WTRU-specific parameters may include, but are not limited to a link identity, an ID of a source WTRU or a destination WTRU; a traffic type; a QoS parameter, a range parameter, and a DM-RS configuration of PSSCH transmission.

A link identity may be determined as a function of source-ID and destination-ID. Hereafter, the term "source-ID" may be interchangeably used with the terms "transmitter-ID," "TX-ID," and/or "source WTRU-ID." Also, the term "destination-ID" may be used interchangeably with the terms "receiver-ID," "Rx-ID," and/or "destination WTRU-ID." In some embodiments, the function to determine link identity may be an exclusive- or operation of the source-ID and destination-ID if the lengths of source-ID and destination-ID are the same. In some embodiments, the link identity may be combination of the source-ID and destination-ID. In some embodiments, the link identity may be assigned by a gNB based on the source-ID and destination-ID. For example, a number may be assigned for the link between a source-ID and destination-ID.

A traffic type may be determined based on an RNTI associated with the SCI. For example, unicast traffic may use a first RNTI, such as a U-RNTI, which may be scrambled using a Cyclic Redundancy Code (CRC) of an SCI. Groupcast traffic may use a second RNTI, such as a G-RNTI, which may be scrambled using a CRC of an SCI. Broadcast traffic may use a third RNTI, such as a B-RNTI, which may be scrambled using a CRC of an SCI. In some embodiments, the traffic type may be determined based on one or more SCI formats. In such cases a first SCI format may be used for unicast traffic, a second SCI format may be used for groupcast traffic, and a third SCI format may be used for broadcast traffic.

For the solutions described above, if a single PSCCH transmission is used to schedule a PSSCH transmission, the PSCCH transmission may be a first PSCCH transmission or a second PSCCH transmission, but may still be consistent with the embodiments disclosed herein.

Figure 3:
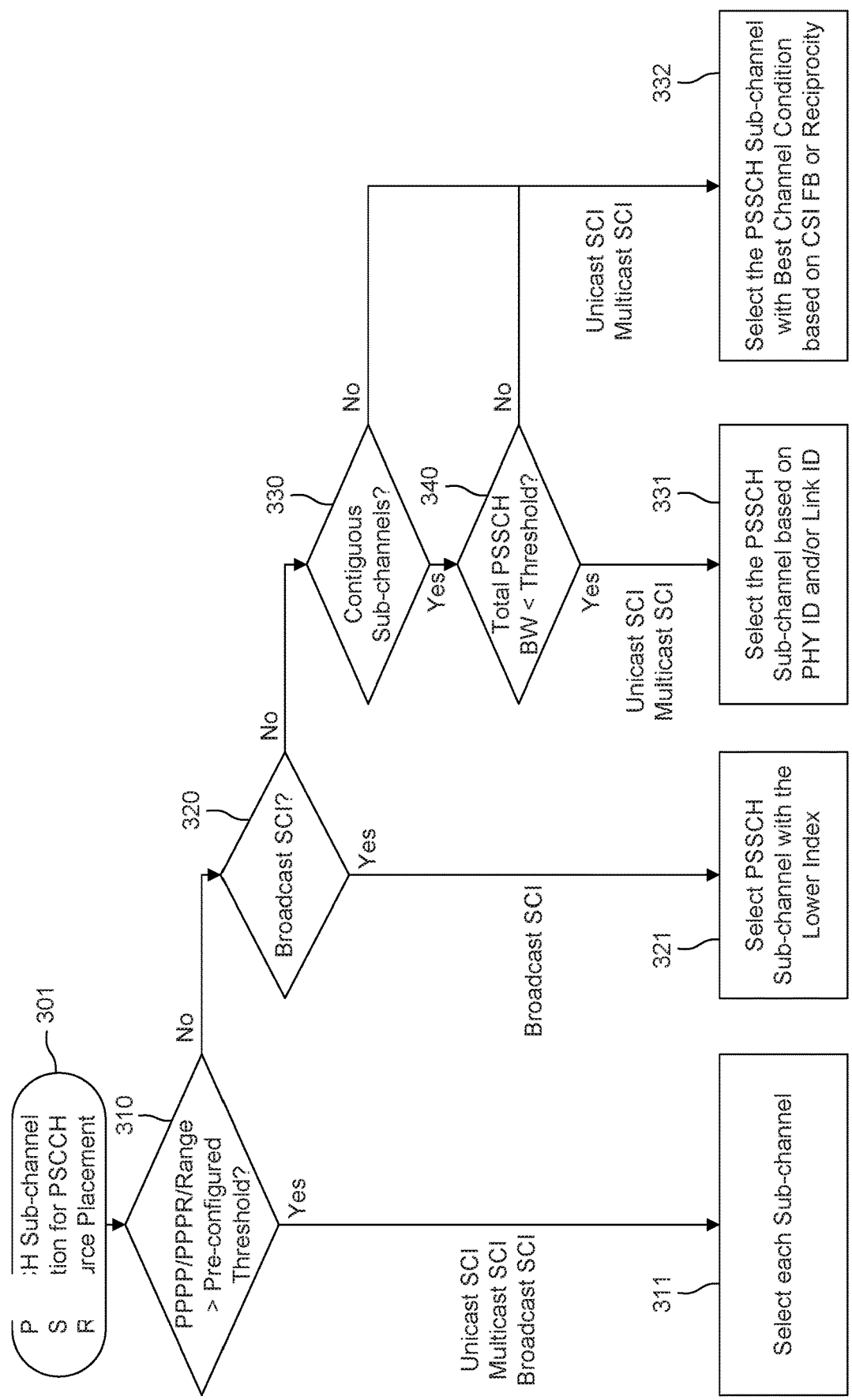
FIG. 3 depicts the determination of PSCCH resources based on one or more parameters by a WTRU.

In solutions disclosed herein, a WTRU may select a PSSCH sub-channel in which to include PSCCH resources based on an SL BWP configuration. A WTRU may determine PSCCH resources based on one or more parameters described above as shown by way of example in FIG. 3. At 301, a WTRU may commence sub-channel selection for PSCCH_1 and PSCCH_2 resources. As shown at 310, the WTRU may determine whether one or more QoS parameters such as a priority, PPPP, or a range, PPPR, exceed a configured threshold. If so, at 311, the WTRU may select each PSSCH sub-channel in which to include both PSCCH_1 and PSCCH_2 resources, substantially as described above. If the QoS parameter does not exceed the preconfigured threshold, the WTRU may determine, at 320, whether the SCI to be transmitted is a broadcast SCI. If so, at 321, the WTRU may select a sub-channel with a lower index. If the SCI to be transmitted is not a broadcast SCI, i.e., the SCI will be unicast or multicast, the WTRU may determine, at 330, whether the PSSCH sub-channels from which to select are contiguous sub-channels. If so, at 340, the WTRU further evaluates whether the total PSSCH bandwidth is less than a threshold. If so, the WTRU may select the PSSCH sub-channel based on at least one of a PHY ID or a Link ID, shown at 331. If the sub-channels of the PSSCH are not contiguous, or the total PSSCH BW meets or exceeds a threshold value, at 332, the WTRU may select the PSSCH sub-channel with the best channel condition based on CSI feedback or reciprocity.

A WTRU may be configured with at least one sidelink BWP and one or more Air Interface (Uu) BWPs. The at least one sidelink BWPs may be used for a sidelink transmission, and the one or more Uu BWPs may be used for a Uu transmission.

In some embodiments in which one or more SL BWPs are configured, a first SL BWP may be used for a sidelink transmission when a WTRU is in-coverage, or performs in-coverage sidelink transmissions, and a second SL BWP may be used for a sidelink transmission when a WTRU is out-of-coverage, or performs out-of-coverage sidelink transmissions. In other embodiments, an SL BWP may be used for both in-coverage sidelink transmissions and out-of-coverage sidelink transmissions.

In some embodiments, one or more SL BWP types may be used. For example, a first SL BWP type may be used for in-coverage sidelink transmissions and a second SL BWP type may be used for out-of-coverage sidelink transmissions. In some cases, a DM-RS type, such as a type-1 DM-RS mapping or type-2 DM-RS mapping, or a sub-channel configuration, such as a localized or distributed sub-channel may be determined based on the SL BWP type. In some embodiments, a SL BWP may be fully or partially overlapped with one or more of the Uu BWPs. A SL BWP may be configured within, or be coextensive with, a default BWP, and the default BWP may include an SSB for the Uu.

In one solution, a WTRU may select one or more PSSCH sub-channels not located in Uu BWPs when a WTRU is configured with a SL BWP that overlaps with a Uu BWP. One or more of the following cases may apply. In one case, when a SL BWP is partially overlapped with a Uu BWP, which may be a default BWP, SL resources overlapped with Uu BWP and SL resources non-overlapped with Uu BWP may be used or handled differently. For example, the SL resources overlapped with Uu BWP may be referred to as a first SL resource and the SL resources non-overlapped with Uu BWP may be referred to as a second SL resource. An SL resource may be a sub-channel or a resource pool. The first SL resource and the second SL resource may be associated with an individual QoS limit or threshold. For instance, the first SL resource may be associated with a first QoS threshold and the second SL resource may be associated with a second QoS threshold. A QoS threshold may be a minimum required QoS parameter value that specifies, for example, that a sidelink transmission should be higher than the given value in order for the associated SL resources to be used. In some embodiments, the first QoS limit may be higher than the second QoS limit. Therefore, a WTRU or node configured to carry out sidelink transmissions with varying priorities may use the first SL resource when the associated QoS parameter is higher than the threshold. Otherwise, the second SL resource may be used for a sidelink transmission.

In some embodiments, the first SL resource and the second SL resource may be associated with a use case, such as in-coverage or out-of-coverage scenarios. For example, the first SL resource may be used for in-coverage sidelink transmissions and the second SL resource may be used for out-of-coverage sidelink transmissions. Use cases may include, but are not limited to vehicle platooning, advanced driving, extended sensors, or remote driving, and each use case may have different requirement values such as latency, reliability, or data rate values.

In some cases, the first SL resource or the second SL resource may be used based on at least one of the following factors: a WTRU speed or relative speed; a Zone-id for a source WTRU; QoS parameters; whether the sidelink transmission is an in-coverage or out-of-coverage transmission; or a PSCCH or PSSCH.

In another solution, when a SL BWP overlaps with a Uu BWP, SL resources overlapped with one or more Uu physical channels may be used considered reserved resources. For example, an SL resource that overlaps with an SSB for Uu (e.g., Uu-SSB) may be reserved or considered an invalid sidelink resource. The Uu physical channel may include an SSB; a PDCCH common search space; or a group-common PDCCH. A SL BWP may be fully or partially overlapped with an UL BWP In solutions described herein, a WTRU may select one or more PSSCH sub-channels within which to include PSCCH resources based on QoS parameters associated with the PSSCH. A sub-channel may be a minimum sidelink resource unit for PSSCH transmission. One or more sub-channels may be used for a PSSCH transmission. One or more of the following configurations may be applied.

For example, each sub-channel may include the associated PSCCH resource, and the associated PSCCH may be located within the PSSCH frequency resource. The associated PSCCH resource in each sub-channel may be preconfigured or predetermined, for instance, as the first N RBs or the first M symbols in a sub-channel.

In another example, when multiple sub-channels are used for a PSSCH transmission, the associated PSCCH transmission may be transmitted over a subset of the sub-channels used for the PSSCH transmission. In some cases, the subset of sub-channels may be the same set of sub-channels for the PSSCH transmission.

In some cases, the subset of sub-channels may be sub-channels that are smaller than the sub-channels used for the PSSCH transmission. In another example, a PSCCH resource in a PSSCH sub-channel may be referred to as PSCCH resource unit (RU). A PSCCH may be configured with an Aggregation Level (AL), which may, for example, specify a number of Control Channel Elements (CCEs) that are allocated for a PSCCH. For instance, the PSCCH AL may be one if a single PSCCH RU is used, or if N PSCCH RUs are used, the PSCCH AL may have a value of N. In some embodiments, if M sub-channels are used for a PSSCH transmission, up to M PSCCH aggregation levels may be used.

In one solution, a WTRU may select PSSCH sub-channels to include PSCCH resources when a QoS parameter associated with a TB exceeds a configured or preconfigured threshold. The QoS parameter may be, for example, a reliability indication in a PPPR, a priority indicated in a PPPP, or a range. In an example, a WTRU may transmit a repetition of the associated PSCCH or PSCCHs in each of the selected sub-channels.

In some embodiments, the WTRU may select all sub-channels of a PSSCH for inclusion of PSCCH resources. In other solutions, the WTRU may determine the subset of PSSCH sub-channels based on one or more factors. For example, a WTRU may determine a subset of PSSCH sub-channels to include PSCCH resources based on the QoS of the sidelink transmission, for instance a PSSCH or one or more individual TBs. In such case, a QoS may be one or more of QoS parameters, such as a PPPP, PPPR, or a range. If a QoS of a sidelink transmission is lower than a threshold, a WTRU may use a first PSSCH sub-channel within the PSSCH sub-channels for the associated PSCCH transmission. If a QoS of a sidelink transmission is higher than a threshold, a WTRU may repetitively transmit PSCCH transmissions, i.e., one or more SCI, over the subset of PSSCH sub-channels. The subset may include all PSSCH sub-channels. In another example, a WTRU may determine a subset of PSSCH sub-channels to include PSCCH resource based on a sidelink coverage level.

In solutions described herein, a WTRU may select one or more PSSCH sub-channels in which to include PSCCH resources based on a physical layer (PHY) ID. In one such solution, a WTRU may select a PSSCH sub-channel for the associated PSCCH based on one or more identifiers for a unicast transmission. The identities for a unicast transmission may include one or more identifiers such as a source-ID, a destination-ID, a combination of a source-ID and a destination-ID, a HARQ process number, a redundancy version, or an NDI toggle status.

In some solutions, a WTRU may select a PSSCH sub-channel whose index is equal to the result of an arithmetic operation, for example, a modulo operation, based on the source ID and the total number of PSSCH sub-channels in the applied resource pool. In another solution, if two PSCCHs are used for a PSSCH scheduling, the PSSCH sub-channel determination for a first PSCCH and a second PSCCH may be different. A first PSCCH may carry a first SCI, and the first SCI may include a first part of the PSSCH scheduling information. A second PSCCH may carry a second SCI, and the second SCI may include a second part of the PSSCH scheduling information. The first SCI may have a first SCI format, for example, SCI format-1, and the second SCI may have a second SCI format, for example SCI format-2. The first SCI may include information that facilitates reception of the second SCI, or the first SCI may indicate the presence of the second SCI.

A first PSCCH (PSCCH-1) may be located in a predetermined set of sub-channels, and the sub-channels for the second PSCCH (PSCCH-2) may be indicated in, or derived from the first PSCCH or from information transmitted over the first PSCCH.

One or more of PSSCH sub-channels for the first PSCCH may be located in predetermined locations within the PSSCH sub-channels. For example, a first PSSCH sub-channel, for example, having a low sub-channel index among the PSSCH sub-channels, may be used for the first PSCCH transmission. One or more PSSCH sub-channels for the second PSCCH (PSCCH-2) may be indicated in or derived from the first PSCCH or from information transmitted over the first PSCCH.

The first PSCCH (PSCCH-1) may be located in a predetermined set of sub-channels, and the sub-channels for the second PSCCH (PSCCH-2) may be determined based on one or more of the above-mentioned identifiers. By selecting sub-channels for the second PSCCH based on the identifiers, the interference for a control channel can be randomized.

In another solution, a WTRU may select a PSSCH sub-channel whose index is equal to the result of an arithmetic operation, for example a modulo operation, based on a source ID and/or a HARQ process ID and a total number of sub-channels (e.g., PSSCH sub-channels scheduled) in the applied resource pool for a TB re-transmission. The total number of sub-channels may be equal to the total number of PSSCH sub-channels scheduled. In another case, the PSSCH sub-channel within the PSSCH sub-channels scheduled for the associated PSCCH may be determined based on a source ID or HARQ process ID.

As described herein, a WTRU may select one or more PSSCH sub-channels in which to include PSCCH resources based on a link ID.

A WTRU may be configured with a group ID for a group transmission, a link ID for a unicast/groupcast transmission, a service ID for a broadcast transmission, or any combination of the aforementioned IDs. In one solution, a WTRU may select a PSSCH sub-channel whose index is equal to the result of an arithmetic operation (e.g. a modulo operation) based on one or more of the link ID, group ID, or service ID, and the total number of sub-channels in the applied resource pool.

As described herein, a WTRU may select one or more PSSCH sub-channels in which to include PSCCH resources based on a sub-channel-specific channel condition. For example, a WTRU may obtain a channel condition of a PSSCH sub-channel based on one or both of a sub-channel CSI feedback or channel reciprocity. In one solution, a WTRU may select the PSSCH sub-channel with the highest CQI value to include PSCCH resources or randomly select among PSSCH sub-channels whose CQI values may be above a configured or preconfigured threshold. In another solution, a WTRU may select the PSSCH sub-channel over which the WTRU obtains the highest signal quality measured among received PSCCH or PSSCH transmissions.

As described herein, an SCI indication of PSSCH sub-channel information may be used by a WTRU to identify the sub-channels used for a PSSCH transmission. For example, a WTRU may indicate a number of contiguous PSSCH sub-channels used for the TB transmission. A WTRU may identify all PSSCH sub-channels based on this information, for example, when the PSCCH resource is located in the PSSCH sub-channel having the lowest sub-channel index. A WTRU may indicate an index of each PSSCH sub-channel used for the TB transmission, for example for PSSCH transmissions using non-contiguous sub-channels.

A WTRU may indicate a bitmap having a length equal to the total number of the sub-channels in the applied resource pool. A WTRU may set a bit in the bitmap corresponding to the PSSCH sub-channel used for the TB transmission.

Solutions for determining an association between resources for a first PSCCH transmission PSCCH_1 and resources for a second PSCCH transmission PSCCH_2 are described herein. In some embodiments, a WTRU may select sub-channels in which to include resources for PSCCH_1 and PSCCH_2 using different rules for each PSCCH. For example, in a two-stage SCI transmission, a WTRU may select a PSSCH sub-channel in which to include PSCCH resources for PSCCH_1 and another sub-channel in which to include resources for PSCCH_2 based on different rules as discussed above. A WTRU may transmit an SCI intended for all SL WTRUs in PSCCH_1 and thus a WTRU may select the PSSCH sub-channel with the lowest sub-channel index. This may reduce the degree of decoding needed to detect the PSCCH_1, because a WTRU may decode a PSCCH in all sub-channels by following an ascending order of the sub-channel indices. A WTRU may transmit WTRU-specific information in PSCCH_2 that may be associated with one or both of a PHY ID or a link ID; thus, a WTRU may select the PSSCH sub-channel for a PSCCH_2 resource based on one or both of the PHY ID or link ID. For a TB transmission having a either or both of a high PPPR value or range, a WTRU may determine to select a single PSSCH sub-channel in which to include both PSCCH_1 and PSCCH_2 resources. In this case, no further sub-channel information for PSCCH_2 may be necessary in PSCCH_1 transmission.

Figure 4:
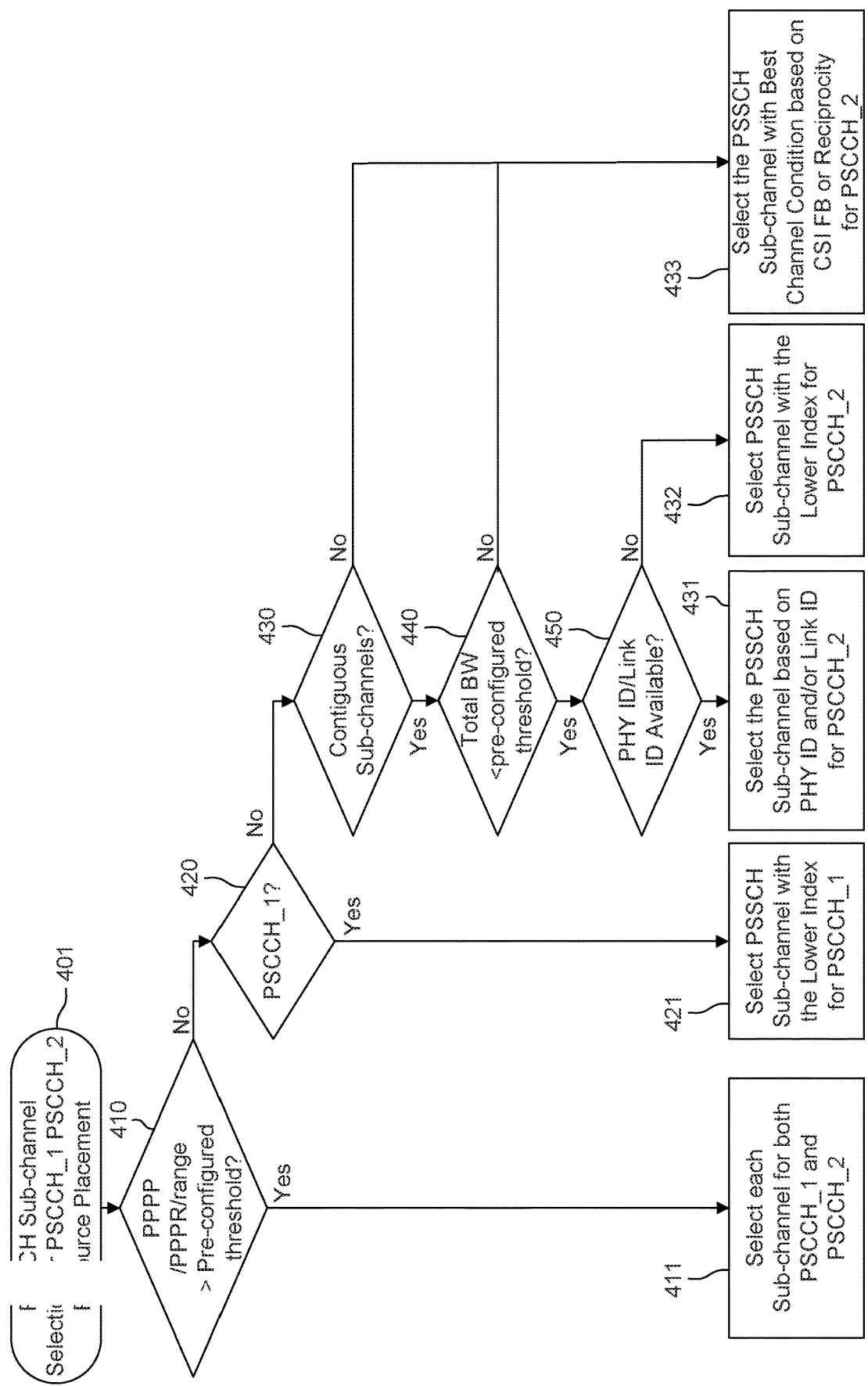
FIG. 4 is an example representation of conditions by which a WTRU may select one or more PSSCH sub-channels in which to include PSCCH_1 and PSCCH_2 resources.

FIG. 4 provides an example representation of conditions by which a WTRU may select one or more PSSCH sub-channels in which to include PSCCH_1 and PSCCH_2 resources. At shown at 401, a WTRU may commence sub-channel selection for PSCCH_1 and PSCCH_2 resources. As shown at 410, the WTRU may determine whether one or more QoS parameters such as a priority, PPPP, or a range, PPPR, exceed a configured threshold. If so, at 411, the WTRU may select each sub-channel in which to include both PSCCH_1 and PSCCH_2 resources, substantially as described above. If the QoS parameter does not exceed the preconfigured threshold, the WTRU may determine, at 420, which PSSCH sub-channel to allocate PSCCH_1. If so, at 421, the WTRU may select a sub-channel with a lower index for PSCCH_1. If the WTRU determines which PSSCH sub-channel to allocate PSCCH_2, the WTRU may further determine, at 430, whether the PSSCH sub-channels from which to select are contiguous sub-channels. If so, at 440, the WTRU further evaluates whether the total PSSCH bandwidth is less than a threshold. If so, the WTRU further evaluates whether a PHY ID or Link ID is available. If so, WTRU selects the PSSCH sub-channel based on at least one or both of the PHY ID or Link ID, shown at 431. If the sub-channels of the PSSCH are not contiguous, or the total PSSCH BW meets or exceeds a threshold value, or a PHY ID or Link ID are not available, at 432, the WTRU may select the PSSCH sub-channel with the best channel condition based on CSI feedback or reciprocity for PSCCH_2.

Figure 5:
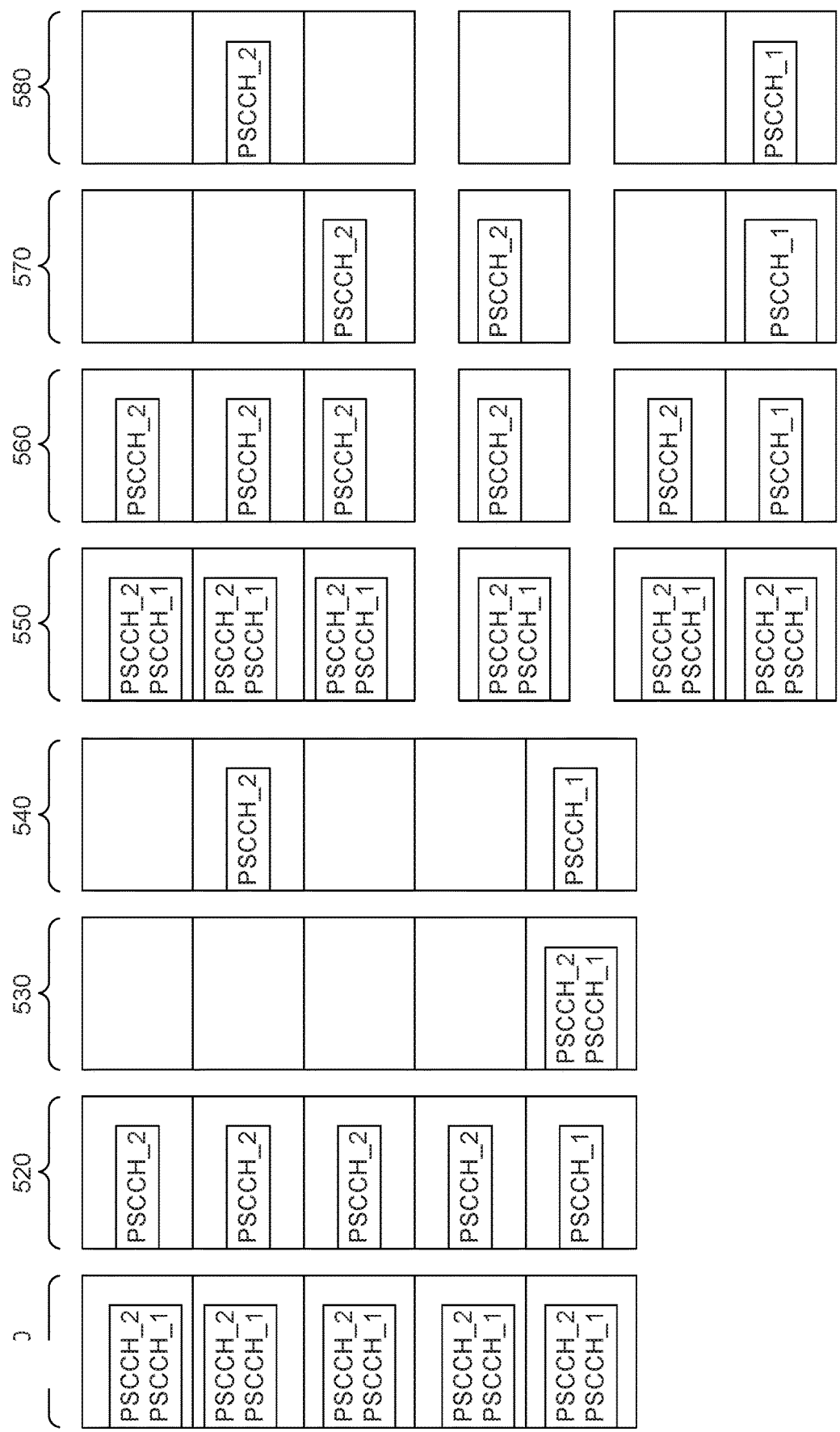
FIG. 5 depicts various examples of PSCCH_1 and PSCCH_2 resource placement in contiguous and non-contiguous PSSCH sub-channels.

PSCCH_1 and PSCCH_2 resources may be located among the same or different PSSCH sub-channels as shown in examples in FIG. 5. In addition to PSSCH sub-channel allocation information, a WTRU may include in PSCCH_1 the information required to identify the PSCCH_2 resources. It may be noted that, in SL links, a receiving WTRU may not possess the information needed to decipher how a transmitting WTRU may select PSCCH_1 and PSCCH_2 resources.

FIG. 5 depicts various examples of PSCCH_1 and PSCCH_2 resource placement in contiguous and non-contiguous PSSCH sub-channels. As shown by 510, 520, 530, and 540, PSCCH_1 and PSCCH_2 may be placed in contiguous PSSCH sub-channels, while 550, 560, 570, and 580 portray the arrangement of PSCCH_1 and PSCCH_2 in non-contiguous channels. 510, 530, and 550 generally depict that PSCCH_1 and PSCCH_2 may be co-located in the same sub-channels, 510 and 550 showing both included in all available sub-channels and 530 showing both included in only a sub-channel having a low index. As shown by 520 and 560, PSCCH_1 may be located only in a lower-most sub-channel as determined by the sub-channel indices, while PSCCH_2 is included in each of the remaining sub-channels.

In some solutions, a WTRU may indicate explicitly in PSCCH_1 the PSCCH sub-channel in which PSCCH_2 resource may be located. For example, a WTRU may use a bitmap field in PSCCH_1 and set the bit to a value that corresponds to a PSSCH sub-channel including the PSCCH_2 resource.

In some solutions, a WTRU may include information in PSCCH_1 that may indicate how a PSCCH_2 resource may be determined. In some examples, a WTRU may include a bit field in PSCCH_1, and each code point may correspond to a configured or preconfigured PSSCH sub-channel determination of the PSCCH_2. In some examples, a WTRU may be configured or preconfigured with a 3-bit field, and each code point may indicate the information as shown below in Table 1, which summarizes examples of the values of a 3-bit field of the SCI carried in PSCCH_1. Note, in this example, three more code points may be used when additional PSCCH_2 resource determination rules are introduced.

PSCCH_2 SCI and a groupcast PSCCH_2 SCI may be the same, but the bit fields may be different. In some cases, a unicast or groupcast indication bit may be used, and zero padding may be applied in certain bits fields to ensure the same total number of SCI bits.

The above characteristics may include QoS parameters of the TB transmitted in the associated PSSCH. For example, a WTRU may be configured with a compact PSCCH_2 SCI format, type, or size for a high-reliability TB transmission. In addition, a unicast or groupcast PSCCH_2 SCI associated with PSSCH transmission with minimum communication range (MCR) requirement may include a bit field in the SCI that may be used to convey an MCS value.

The above characteristics may include the activity of HARQ processes—for instance, whether HARQ feedback is enabled or disabled. For example, a unicast PSCCH_2 SCI format, type, or size associated with a PSSCH transmission with HARQ disabled may not include bit fields of a HARQ process ID, RV or NDI. A unicast PSSCH_2 SCI format, type, or size associated with a PSSCH transmission with HARQ enabled may also include a bit field for resource reservation of HARQ re-transmission.

The above characteristics may include the activity of CSI reporting—for instance, whether CSI reporting is enabled or disabled. For example, a unicast PSCCH_2 SCI format, type, or size associated with a PSSCH transmission with CSI disabled may not include bit fields pertaining to CSI request information or CSI reporting resource reservation information. In another example, a unicast PSCCH_2 SCI format, type, or size associated with a PSSCH transmission including multiplexed CSI reporting bits may include a new bit field to indicate the presence of the coded CSI bits in the PSSCH resource.

The above characteristics may include a group HARQ scheme designed to indicate NACK-only feedback or ACK/NACK feedback. For example, a group HARQ transmission

TABLE 1

Example resource configurations of PSCCH_2 s indicated in SCI.

| | Value | | | | |
|---|---|---|---|---|---|
| | 0 | 1 | 2 | 3 | 4 |
| PSCCH_2 resource configuration | Repeated in all PSSCH sub-channels | In PSSCH sub-channel with the lower sub-channel index, i.e. the same as PSCCH_1 | In PSSCH sub-channel with lower sub-channel index in each non-contiguous PSSCH sub-channel block | Based on PHY ID such as source ID or Link ID | In PSSCH sub-channel with the best channel condition based on feedback |

Embodiments directed to WTRU determination of information required for PSCCH_2 decoding are described herein. In some embodiments, a WTRU may be configured or preconfigured with a set of SCI formats, types, or sizes for PSCCH_2. Each PSCCH_2 SCI format, type, or size may have a different number of total SCI payload information bits, different bit fields in the SCI payload, and may convey different information in each bit field. A PSCCH_2 SCI format, type, or size may be configured or preconfigured to apply for one or multiple characteristics. Such characteristics may include a PSSCH transmission type. For example, a total number of SCI bits for a unicast PSCCH_2 SCI and a groupcast PSCCH_2 SCI may be different. In another example, the total number of SCI bits for a unicast scheme that indicates ACK/NACK feedback may include additional SCI bit fields for both ACK and NACK transmission resource reservation.

In some embodiments, a WTRU may be configured or preconfigured with a PSCCH_2 SCI format, type, or size for a unicast transmission with HARQ and CSI enabled. In another example, a PSCCH_2 SCI format, type, or size may be configured or preconfigured for a unicast transmission with HARQ and CSI disabled.

In some embodiments, a WTRU may select a PSCCH_2 SCI format, type, or size from a configured or preconfigured set based on a resource allocation of the PSCCH_1 SCI transmission and the WTRU may use the PSCCH_2 SCI format, type, or size to decode a PSCCH_2 transmission. For example, a WTRU may be configured or preconfigured with a dedicated resource allocation, such as a resource pool, or a set of sub-channels or subcarriers in a resource pool for unicast transmission. A WTRU may thus decode a PSCCH_2 SCI according to a unicast PSCCH_2 SCI format, type, or size in these configured or preconfigured resources. Similarly, a WTRU may be configured or preconfigured with such dedicated resource allocation for groupcast transmission and the WTRU may decode a PSCCH_2 SCI according to a groupcast PSCCH_2 SCI format, type, or size in these resources.

In another solution, a WTRU may select and decode a PSCCH_2 SCI format, type, or size from the configured or preconfigured set based on the information decoded from the PSCCH_1 SCI. The decoded information may include, for example, a link identity. A link identity may be determined as a function of WTRU Source ID and WTRU Destination ID. In another example, the link identity may be exchanged in higher layer signaling during the link establishment procedure. The decoded information may include a WTRU L1 Source ID and L1 Destination ID. Such WTRU L1 IDs may be based on the WTRU IDs assigned by higher layers and carried in L1 signaling. The decoded information may include a QoS parameter of the TB transmitted in the associated PSSCH. For example, a WTRU may indicate the priority, latency, reliability and minimum communication range information pertaining to the TB transmitted in the associated PSCCH_1 SCI transmission. Such QoS parameters may be based on PQI/5QI information indicated by the higher layers. The decoded information may include a frequency domain resource assignment for scheduling the PSSCH. The decoded information may include an explicit indication of the PSCCH_2 SCI format, type, or size in the PSCCH_1 SCI.

Identity information such as a Link Identity, WTRU L1 Source and Destination ID information may be explicitly indicated in a PSSCH_1 SCI bit field or applied via CRC scrambling. In some solutions, a WTRU may be configured or preconfigured with an association between the identity information and a unicast or groupcast transmission. A WTRU may determine whether to decode a PSCCH_2 SCI according to a unicast or groupcast PSCCH_2 SCI format, type, or size based on the Link Identity, L1 Source ID or Destination ID. In another solution, a WTRU may determine the SCI format, type, or size based on an explicit indication carried in the PSCCH_1 SCI. For example, a WTRU may determine to continue to decode a PSCCH_2 SCI when the SCI format, type, or size bit field of the PSCCH_1 SCI indicates a unicast or groupcast transmission.

In some embodiments, the L1 WTRU Source and Destination ID may be derived based on a 24-bit L2 WTRU ID, for example, using 8 or 16 Least Significant Bits (LSBs) of the L2 WTRU ID. This shortened version of the WTRU ID may cause collision, for example, between two WTRUs L2 WTRU IDs having identical 8 or 16 LSBs. In some solutions, a L1 WTRU ID, for example, a destination ID, may be the same as the L2 WTRU ID and carried explicitly in the PSCCH_1 SCI. This may increase the L1 signaling overhead.

In one solution, a WTRU ID, such as a L1 Destination ID, may be carried in both the PSCCH_1 SCI and the PSCCH_2 SCI. For example, 8 bits of a WTRU destination ID may be indicated explicitly in PSCCH_1 SCI and the rest of the WTRU destination ID (16 bits) may be indicated in PSCCH_2 SCI explicitly or implicitly. The implicit indication may be conveyed, for example, via scrambling of the PSCCH_2 SCI based on or using a CRC. The implicit indication may be conveyed via the allocation of PSCCH_2 SCI RBs, such as a starting RB index, or a DMRS configuration or sequence that is based on the remaining 16 bits of the WTRU destination ID. Therefore, a WTRU may decode both PSCCH_1 SCI and PSCCH_2 SCI for broadcast, groupcast, or unicast transmissions. One advantage may be to minimize false SCI decoding due to the collision of an L1 WTRU ID when an L1 WTRU ID is a part of an L2 WTRU ID.

In some solutions, a WTRU ID, such as an L1 Source ID, may be carried in PSCCH_2 SCI for unicast and groupcast transmissions. In order to avoid WTRU ID collision while maintaining a low L1 signaling overhead, a WTRU may implicitly indicate the 16 LSBs of the L2 WTRU ID by scrambling the PSCCH_2 SCI by a CRC, configuring a DMRS, such as a sequence, or allocating a frequency or frequencies, such as a starting RB, for PSCCH_2 SCI based on the 16-bit LSB. The remaining 8 bits may be carried explicitly in a bit field of the PSCCH_2 SCI.

In another solution, a WTRU may be configured or preconfigured with an association between the identity information or a QoS parameter and one or more transmission features. For example, the unicast identity information may indicate whether HARQ feedback and re-transmission may be enabled or disabled for the associated PSSCH transmission. In another example, the unicast identity information may indicate whether a CSI reporting may be enabled for the associated PSSCH transmission. In another example, the group identity information may indicate whether a NACK-only-based or an ACK/NACK-based HARQ transmission may be applied to the associated PSSCH transmission.

In some solutions, a WTRU may include two different identity information in PSCCH_1 SCI for the same unicast link; one may indicate that HARQ feedback and re-transmission is enabled and the other may indicate that HARQ feedback and re-transmission is disabled. A WTRU may therefore determine whether to decode a PSCCH_2 SCI according to a configured or preconfigured unicast PSCCH_2 SCI format, type, or size with HARQ enabled or disabled based on the Link Identity, L1 Source ID or Destination ID decoded from the PSCCH_1 SCI. With the same approach, a WTRU may determine whether to decode a PSCCH_2 according to a configured or preconfigured unicast PSCCH_2 SCI format, type, or size with CSI reporting enabled or disabled based on the Link Identity, L1 Source ID or Destination ID decoded from the PSCCH_1 SCI.

In another example, when a QoS metric such as priority, reliability, latency, or range is decoded from the PSCCH_1 SCI and exceeds a configured or preconfigured threshold, a WTRU may decode a PSCCH_2 according to a configured or preconfigured unicast PSCCH_2 SCI format, type, or size with HARQ enabled. The QoS information in PSCCH_1 SCI may implicitly indicate whether HARQ feedback or re-transmission is enabled or disabled for the associated TB transmission. With the same association between QoS information in PSCCH_1 SCI and CSI reporting enabled/disabled feature, a WTRU may determine whether to decode a PSCCH_2 according to a configured or preconfigured unicast PSCCH_2 SCI format, type, or size with CSI reporting enabled or disabled based on the QoS information decoded from the PSCCH_1 SCI.

In another example, when the PSSCH frequency resource is decoded from the PSCCH 1 SCI, the PSCCH 2 SCI format, type, or size may be determined accordingly. For example, if a PSSCH occupies more than one sub-channel, then the SCI format, type, or size associated with a larger size may be selected. For groupcast transmissions, a WTRU may determine whether to decode a group PSCCH_2 SCI according to a groupcast SCI format, type, or size with HARQ using a NACK-only or ACK/NACK option based on the Link Identity, L1 Source ID, Destination ID or QoS information decoded from a groupcast PSCCH_1 SCI transmission.

Solutions directed to determining PSCCH_2 SCI transmission configurations are described herein. In order to decode a PSCCH_2 SCI according to a determined PSCCH_2 SCI format, type, or size, a WTRU may determine the PSCCH_2 SCI transmission configuration. The transmission configuration may include a resource element allocation of the PSSCH_2 SCI transmission, such as the symbols, PRBs and sub-carriers occupied by the PSCCH_2 SCI transmission. The transmission configuration may include a transport format of the PSCCH_2 SCI transmission, such as the coding rate, the aggregation level, and the repetition scheme. The transmission configuration may include a multi-antenna transmission scheme of the PSCCH_2 SCI transmission, such as the number of antenna ports applied or the precoding configuration. A WTRU may determine the PSCCH_2 SCI transmission resource element allocation based on at least one of the determined PSCCH_2 format, type, or size, or a resource reservation of the associated PSSCH decoded from PSCCH_1 SCI.

In some solutions, a WTRU may receive PSCCH 2 SCI information in the resources allocated for its associated PSSCH. For example, the PSCCH_2 SCI bits may be encoded and multiplexed with the associated PSSCH bits in a sub-channel scheduled for the PSSCH in a PSCCH_1 SCI transmission. In another example, a WTRU may transmit encoded PSCCH_2 SCI bits in a MAC CE in the associated PSSCH. In such cases, a WTRU may determine the PSCCH_2 SCI resource element allocation based on the resource reserved for the associated PSSCH in the PSCCH_1 SCI.

It may be advantageous that the bits of the determined PSCCH_2 SCI format, type, or size are encoded with adequate coding gain to ensure PSCCH_2 SCI decoding performance. This may be because, for example, this transmission may be "one-shot" without any HARQ re-transmission, and PSCCH_2 SCI format, type, or size can have different number of total bits and bit field that may require different levels of protection again adverse channel conditions and path loss.

Thus, within the determined resource element allocation, a WTRU may further determine the number of resource elements, locations of these resource elements and coding rates of the determined PSCCH_2 format, type, or size based on one or multiple factors. Such factors may include the PSCCH_2 format, type, or size; a Modulation and Coding Scheme (MCS) of the associated PSSCH; a QoS parameter pertaining to the associated PSSCH; a DMRS configuration of the associated PSSCH; an antenna port configuration; WTRU identity information such as Link Identity, WTRU L1 Source ID or WTRU L1 Destination ID; an aggregation level of PSCCH_1 SCI; or a PSSCH MCS or coding rate.

In one example, a WTRU may determine a PSCCH_2 SCI transmission aggregation level or coding rate based on a WTRU TX-RX distance derived from the WTRU identity information. A WTRU may associate the geographical location information with its identity information and update the information at a regular basis. A WTRU may be configured or preconfigured with a set of coding rates, and each may be associated with a WTRU TX-RX distance value. A WTRU may therefore select an aggregation level or a coding rate or rates of the PSCCH_2 SCI based on the WTRU identity information.

In addition, a WTRU may determine the coding rate of PSCCH_2 SCI based on the PSCCH_2 format, type, or size selected for the PSCCH_2 SCI decoding. For example, a WTRU may be configured or preconfigured with a set of coding rates with each associated with the configured or preconfigured PSCCH_2 format, type, or size.

A WTRU may determine the MCS or coding rate of PSCCH_2 SCI based on a DMRS configuration indicated in PSCCH_1 SCI. The DMRS configuration, for instance, a sequence, length, and/or density in time and frequency, may be associated with a pre-configured MCS or coding rate index of a PSCCH_2 SCI transmission.

A WTRU may determine the PSCCH_2 SCI MCS or coding rate based on the PSSCH MCS information indicated in the PSCCH_1 SCI. A WTRU may apply the determined aggregation level or coding rate together with the MCS information of the associated PSSCH to decode the PSCCH_2 SCI transmission.

In another solution, the MCS or coding rate of PSCCH_2 SCI may be explicitly indicated in PSCCH_1 SCI, and the MSC information of the associated PSSCH may be indicated in PSCCH_2 SCI. For example, the PSSCH MCS information may be an absolute MCS index or an offset or delta that may indicate the difference between the PSCCH_2 SCI MCS and the PSSCH MCS. This may reduce the L1 signaling required in PSCCH_2 SCI.

In another solution, a WTRU may determine the location of PSCCH_2 SCI resource elements based on the DMRS density and location within the associated PSSCH. Furthermore, the WTRU may determine the location of each bit field of the identified PSCCH_2 format, type, or size relative to the DMRS resources. For example, HARQ-related bit fields of a PSSCH_2 SCI format, type, or size (with HARQ enabled), including an L1 Source ID, HARQ process ID, New Data Indicator (NDI) or Redundancy Version (RV), may be transmitted next to the DMRS resources both in time and frequency domains to provide robustness of decoding performance of these bit fields.

In another solution, a WTRU may be configured or preconfigured with a set of rules to distribute the encoded PSCCH_2 SCI bits to different frequencies for different frequency hopping instances based on QoS information received in PSCCH_1 SCI. For each PSCCH_2 SCI format, type, or size, a WTRU may determine which encoded bits may be distributed in a frequency hopping instance. In another example, PSCCH_2 SCI bits may be repeated in each frequency hopping instance. This may enable the PSCCH_2 SCI transmission to apply frequency selectivity gain.

A WTRU may determine to decode a PSCCH_2 SCI transmission based on a layer mapping and precoding information indicated in the PSCCH_1 SCI. For example, the PSCCH_1 SCI may indicate how many layers the PSCCH_2 SCI transmission may apply. In another solution, a WTRU may perform blind detection on a multi-antenna configuration based on the DMRS configuration in the PSSCH_1 SCI transmission. A WTRU may attempt to decode a PSCCH_2 transmission using the DMRS configuration for all configured or preconfigured antenna configurations and evaluate the CRC results at each configured or preconfigured antenna configuration. The CRC check may be performed only for the antenna configuration actually used for the PSCCH_2 transmission.

Thus, a WTRU may search for SCI carried in PSCCH_1 in each sub-channel starting from the PSCCH of the lowest sub-channel index in the SL resource pool. When the WTRU decodes a PSCCH_1 transmission, the WTRU may obtain PSSCH sub-channel allocation information and determine which PSSCH sub-channel or sub-channels contains the PSCCH_2 resource or resources based on the explicit or implicit indication discussed above. The WTRU may apply the PSCCH_2 resource information to locate and decode the PSCCH_2 transmission and rate-match the PSSCH data.

Solutions directed to determining whether to use one-stage and two-stage SCI transmissions are disclosed herein. Such determinations may be made by a WTRU. A WTRU may determine to whether to use a one-stage or two-stage SCI transmission for a broadcast transmission based on a QoS range requirement. In one solution, a WTRU may use one-stage SCI transmission, i.e., perform one PSCCH transmission, when a range parameter is not associated with the TB. A WTRU may use a two-stage SCI transmission, i.e., perform two PSCCH transmissions, and carry range-based parameters, such as a minimum communication range requirement and location information of a TX WTRU, in the PSCCH_2 SCI. An RX WTRU may be able to determine the TX-RX distance based on the WTRU location information and compare with the minimum communication range requirement.

Solutions directed to WTRU determination of PSCCH resources within an SL resource are described herein. A PSCCH resource may be located within a sub-channel, and a sub-channel may be a minimum resource unit for a sidelink transmission. A WTRU may perform one or a combination of steps. For example, a WTRU may determine one or more sub-channels for a sidelink transmission and then select a PSCCH location within the determined sub-channel or sub-channels. The WTRU may sense one or more sub-channels and select a subset of sub-channels, which may be considered empty or available for sidelink transmission.

In some solutions, a WTRU may determine a PSCCH resource or resources within the selected sub-channels, and the selected sub-channels may be used at least for PSCCH and PSSCH transmission. The PSCCH time or frequency location within the selected sub-channels may be determined based on one or more parameters. Such parameters may include, for example, a link identity, a source ID, a destination ID, a service ID; a QoS parameter of the sidelink transmission; a parameter indicating whether the WTRU is in-coverage or out-of-coverage.

Whether a WTRU uses localized resources for a PSCCH, for instance, contiguous RBs, or the WTRU uses distributed resources for the PSCCH, such as non-contiguous RBs, may be determined based on one or more factors. Such factors may include a total number of RBs for the selected sub-channels, where the selected sub-channels may be contiguous or non-contiguous. For example, the total number of RBs for the selected sub-channels may be less than a threshold, and a localized resource may be used for a PSCCH. Otherwise, a distributed resource may be used for a PSCCH. Resources used by a WTRU for a PSCCH may also be determined based on a DM-RS density. For example, if DM-RS time density is lower than a threshold, for instance, 2 symbols, a localized resource may be used for a PSCCH. Otherwise, a distributed resource may be used for a PSCCH. Resources used by a WTRU for a PSCCH may also be determined based on a traffic type used. For example, a distributed resource may be used for a PSCCH when a sidelink transmission is for broadcast or groupcast traffic; a localized resource may be used for a PSCCH when a sidelink transmission is for unicast traffic. Resources used by a WTRU for a PSCCH may also be determined based on a QoS parameter.

In some solutions, the location of PSCCH resources within the selected sub-channels may be determined based on the number of symbols, such as OFDM symbols or DFT-s-OFDM symbols available for a sidelink transmission.

Figure 6:
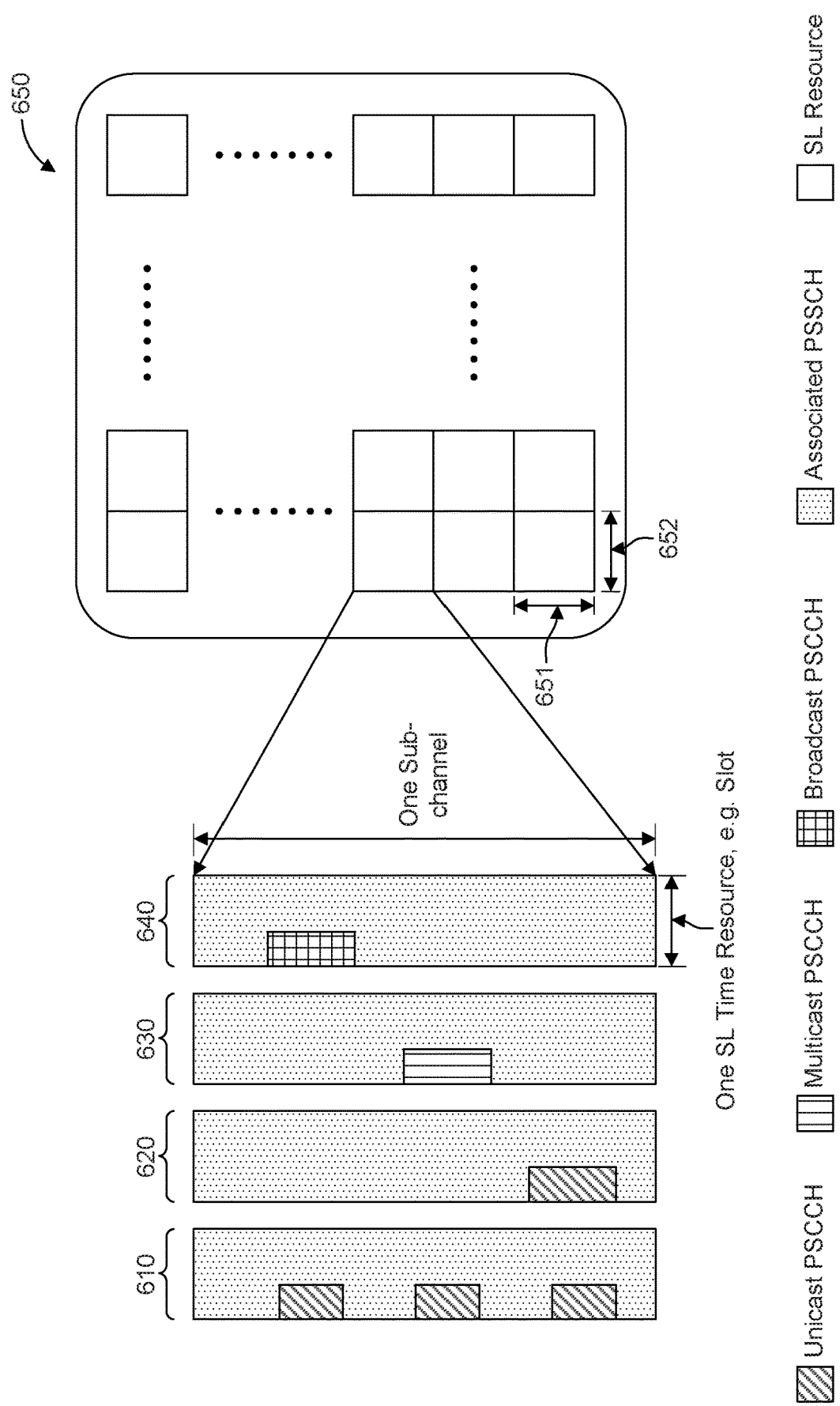
FIG. 6 depicts the determination of PSCCH resources from within an SL resource.

FIG. 6 depicts the determination of PSCCH resources from within an SL resource. A WTRU may be configured with an SL resource pool 650 that may consist of SL time and frequency resources, such as a slot and a sub-channel as shown in FIG. 6. The SL resource pool may contain PSSCH resources shown by 610, 620, 630, and 640, each of which depicts examples of sub-channels carrying PSCCH resources over a single slot. A WTRU may perform a transmission over one PSSCH using one or a set of SL resources in one SL time resource 652, which may be, for example, a slot. The frequency dimension of the SL resource, i.e., a sub-channel, is shown by way of example at 651. A WTRU may determine a set of PSCCH resources for the transmission of the associated PSCCH in one or a number of SL resources. A PSCCH resource within an SL resource may be configured with any of the parameters as follows: a starting RB, which may be an index of the first RB of a PSCCH resource; a bandwidth, which may be a number of consecutive RBs of a PSCCH resource; a starting symbol, which may be an index of the first symbol of a PSCCH resource; a duration or length, which may be a number of consecutive symbols of a PSCCH resource; or a PSCCH resource allocation mode which may include localized and distributed modes. A WTRU may determine one PSCCH resource in one SL resource in the localized PSCCH resource allocation mode. A WTRU may determine multiple PSCCH resources in one SL resource in the distributed PSCCH resource allocation mode.

As shown in FIG. 6, slot 610 depicts an example of allocation of PSCCH resources within the PSSCH resource in the distributed mode, while slots 620, 630 and 640 depict examples of PSCCH resource allocation in the localized mode, according to the transmission type. Slot 610 depicts the allocation of resources within the PSSCH resource for a broadcast PSCCH transmission. Slot 620 depicts, for example, the allocation of PSCCH resources within the PSSCH channel for a broadcast transmission. Slot 630 depicts, for instance, the allocation of PSCCH resources within the PSSCH sub-channel for a multicast PSCCH transmission. Slot 640 depicts, for instance, the allocation of PSCCH resources in the PSSCH sub-channel for a unicast transmission.

Embodiments directed to WTRU determination of PSCCH resources are described herein. A WTRU may determine one or multiple PSCCH resources and their parameters based on, for example, an SCI format type carried in the PSCCH, such as a unicast SCI, multicast SCI, broadcast SCI, SCI containing WTRU-common information such as the first SCI in a 2-stage SCI transmission and SCI containing WTRU-specific information such as the second SCI in a 2-stage SCI transmission. A WTRU may determine one or multiple PSCCH resources and their parameters based on an associated SL transmission QoS parameter, such as a priority, reliability, latency, or range. A WTRU may determine one or multiple PSCCH resources and their parameters based on an SL resource configuration, such as a sub-channel size and slot duration. A WTRU may determine one or multiple PSCCH resources and their parameters based on a PHY ID, such as a Source ID, destination ID, HARQ Process ID configured by higher layer for each applicable SL transmission. A WTRU may determine one or multiple PSCCH resources and their parameters based on a Link ID, such as a link identity and/or a link index that a WTRU may use to maintain and distinguish multiple established unicast, multicast, and broadcast transmissions. A WTRU may determine one or multiple PSCCH resources and their parameters based on a channel condition, such as SL feedback information (CQI/PMI/RI), WTRU positioning information, WTRU mobility information, Doppler estimate, channel reciprocity, or LOS detection. A WTRU may determine one or multiple PSCCH resources and their parameters based on a beamforming configuration, such as the spatial domain transmission filtering configuration used for the PSCCH resource in FR2 operation.

In some solutions, a WTRU may determine the PSCCH starting RB based on an SCI format type carried in the PSCCH. For example, a WTRU may be configured or preconfigured with an offset in terms of a number of RBs for each SCI format relative to the starting RB of the sub-channel. In another example, a WTRU may be configured or preconfigured with an absolute RB index for each SCI format. In another solution a WTRU may determine the PSCCH starting RB based on a SCI format type carried in the PSCCH and the sub-channel size. A WTRU may be configured or preconfigured with an offset for each SCI format and a pre-defined sub-channel size.

As a result, a WTRU may perform PSCCH transmissions associated with unicast, multicast and broadcast transmission in different RBs in one sub-channel as shown in FIG. 2, previously introduced and described in paragraphs above. With one PSCCH resource, a WTRU may transmit an SCI containing WTRU-common information such as the first SCI in a two-stage SCI transmission in different RBs than those of the second SCI. In some cases, a WTRU may transmit the first SCI and second SCI at different symbols within one PSCCH resource.

A WTRU may determine the PSCCH resource starting symbol, duration, and/or length based on a configured QoS latency requirement. For example, a WTRU may determine a PSCCH resource in the beginning of a slot for a TB associated with a low latency indicated in a Packet Delay Budget (PDB) that may be lower than a configured or preconfigured threshold.

A WTRU may determine the PSCCH resource bandwidth, duration, and/or length based on a configured QoS reliability requirement. For example, a WTRU may determine a number of RBs and symbols of the PSCCH resource for a TB based on a PPPR or a minimum communication range. A WTRU may be configured or preconfigured with a mapping between the PSSCH resource size and each PPPR and minimum communication range value. In another solution, a WTRU may determine such PSCCH resource size based on available channel conditions specific to the sub-channel. For example, a WTRU may be configured or preconfigured with a mapping between the PSCCH resource size and an SL CQI value.

A WTRU may determine the PSCCH resource starting symbol, duration, and/or length based on a configured or preconfigured PHY ID. For example, a WTRU may determine a starting RB index by performing a modular operation using a source ID or destination ID and a number of total RBs in the sub-channel. In another example, a WTRU may determine a starting RB index of a PSCCH resource associated with a re-transmission based on a source ID and/or HARQ process ID. In another solution, a WTRU may be configured with a unique link ID for each established unicast transmission, and the WTRU may determine the PSCCH resource starting symbol, duration, and/or length based on the link ID.

A WTRU may determine a PSCCH resource allocation mode based on a size of sub-channel configured for a SL resource. For example, a WTRU may determine to enter a distributed PSCCH resource allocation mode for a sub-channel configuration of number of PRBs that may be larger than a configured or preconfigured threshold. As illustrated in FIG. 5, previously introduced and described in paragraphs above, in a distributed PSCCH resource allocation mode, a WTRU may transmit a PSCCH in a set of PSCCH resources within one SL resource. For example, each PSCCH resource may be of the same size in time and frequency and may be evenly distributed within the sub-channel bandwidth. THE distributed mode may provide frequency diversity to PSCCH transmissions when a sub-channel may have a bandwidth larger than the channel coherence bandwidth.

In some solutions, a WTRU may determine a PSCCH resource allocation mode based on a beamforming configuration used for the PSCCH transmission. For example, a WTRU may determine to enter a localized PSCCH resource allocation mode for a transmission using a narrow beam. The narrow-beam transmission may experience reduced delay spread and, thus, may have a large coherence bandwidth. Accordingly, there may not be frequency diversity to explore.

Solutions directed to WTRU determination of L1 priority are described herein. A WTRU may be configured or preconfigured with a 5QI for each supported V2X service. A set of such 5QI values may be pre-specified and each may have a one-to-one mapping to a combination of pre-defined QoS parameters. Such QoS parameters may include: a resource type, such as a guaranteed bit rate (GBR), delay critical GBR or non-GBR; a priority level; a packet delay budget; a packet error rate; an averaging window, for example, for GBR and/or delay-critical GBR resource type only; a maximum data burst volume, for example, for delay-critical GBR resource types only. In addition, a WTRU may be configured or preconfigured with a Minimum Communication Range (MCR) requirement for each V2X service.

An L1 priority may be determined based on the 5QI and MCR requirement of a TB and indicated in the SCI associated with the PSSCH transmission of the TB. The L1 priority may be an numeric indicator. The numeric indicator may be one of, or any combination of: an index identical to 5QI; an index to a 5QI value based on a configured or preconfigured mapping; an index to a 5QI value and MCR requirement based on a configured or preconfigured mapping; an index to one or a subset of QoS parameters of 5QI based on a configured or preconfigured mapping; an index to one or a subset of QoS parameters of 5QI and MCR requirement based on a configured or preconfigured mapping; or an index to a dynamically configured priority level.

In some solutions, an L1 priority may be identical to a 5QI, or a WTRU may indicate the 5QI value as the L1 priority via SCI. The L1 priority value may be the same as a configured or preconfigured 5QI value and may correspond to the pre-specified 5QI QoS parameters as shown by way of example in Table 2 below.

TABLE 2

L1 Priority Identical to 5QI

| L1 Priority Value | 5QI | Resource Type | Default Priority Level | Packet Delay Budget | Packet Error Rate | Default Maximum Data Burst Volume | Default Averaging Window |
|---|---|---|---|---|---|---|---|
| x | x | GBR | 20 | 100 ms | $10^{-2}$ | N/A | 2000 ms |

In some solutions, a WTRU may indicate the 5QI value as the L1 priority in SCI. The L1 priority value may be based on a configured or preconfigured mapping to the 5QI value and may correspond to the pre-specified 5QI QoS parameters as shown by way of example in Table 3 below. The 5QI values may be specified or pre-specified with large values, and re-mapping the 5QI values to small values may save L1 signaling overhead.

TABLE 3

L1 Priority Mapped to 5QI Value

| L1 Priority Value | Resource Type | Default Priority Level | Packet Delay Budget | Packet Error Rate | Default Maximum Data Burst Volume | Default Averaging Window |
|---|---|---|---|---|---|---|
| x | GBR | 20 | 100 ms | $10^{-2}$ | N/A | 2000 ms |

In some solutions, an L1 priority may be indexed to 5QI index and an MCR requirement based on a configured or preconfigured mapping. A WTRU may indicate both the 5QI and MCR requirement in the L1 priority. For example, the L1 priority may be an index to a full set of 5QI parameters and an MCR requirement as shown by way of example in Table 4 below. One advantage of including an MCR in the L1 priority may be to indicate the MCR requirement implicitly via SCI decoding.

TABLE 4

L1 Priority Indexed to 5QI Index and MCR Requirement

| L1 Priority Value | Resource Type | Default Priority Level | Packet Delay Budget | Packet Error Rate | Default Maximum Data Burst Volume | Default Averaging Window | MCR |
|---|---|---|---|---|---|---|---|
| x | GBR | 20 | 100 ms | $10^{-2}$ | N/A | 2000 ms | 100 meters |

In some solutions, an L1 priority may be indexed to one or a subset of 5QI parameters. As shown by way of example in Table 5 below, a WTRU may be configured or preconfigured with an L1 priority as an index to one of the 5QI parameters, which may include a default priority level, a packet delay budget, or a packet error rate, based on a configured or preconfigured mapping. In some cases, a WTRU may be configured or preconfigured with an L1 priority as an index to a subset of the 5QI parameters based on a configured or preconfigured mapping. For example, an L1 priority may be an index to one or a combination of a resource type, a default priority level, a packet delay budget, and a packet error rate as shown below. In another example, an L1 priority may be an index to a combination of a resource type, a default priority level, and a packet error rate.

TABLE 5

L1 Priority Indexed to Subset of 5QI Parameters

| L1 Priority Value | Resource Type | Default Priority Level | Packet Delay Budget | Packet Error Rate |
|---|---|---|---|---|
| x | GBR | 20 | 100 ms | $10^{-2}$ |

In some solutions, an L1 priority may be indexed to one or subset of 5QI parameters and an MCR requirement. For example, a WTRU may be configured or preconfigured with an L1 priority as an index to one or more of the 5QI parameters and MCR requirement based on a configured or preconfigured mapping. The 5QI parameter may be, for example, a default priority level, a packet delay budget, or a packet error rate.

In some solutions, a WTRU may be configured or preconfigured with an L1 priority as an index to a subset of the 5QI parameters and MCR requirement based on a configured or preconfigured mapping. For example, an L1 priority may be an index to one or a combination of a resource type, a default priority level, a packet delay budget, a packet error rate, or an MCR requirement, as shown by way of example in Table 6 below. In another example, an L1 priority may be an index to one or a combination of a resource type, a default priority level, a packet error rate, or an MCR requirement.

TABLE 6

L1 Priority Indexed to Subset of 5QI Parameters and MCR Requirement

| L1 Priority Value | Resource Type | Default Priority Level | Packet Delay Budget | Packet Error Rate | MCR |
|---|---|---|---|---|---|
| x | GBR | 20 | 100 ms | $10^{-2}$ | 100 meters |

In some solutions, an L1 priority may be indexed to a dynamically configured priority level. A WTRU may be configured dynamically with a priority level of a TB, for example, when the priority level is not included in the configured or preconfigured default priority level of a 5QI. In such cases, a WTRU may use an L1 priority as an index to the dynamically configured priority level. In order to differentiate the L1 priority based on a 5QI and dynamically configured priority level, an L1 priority indexed to the dynamic priority level apply may use a specified or pre-specified offset so that the value of the L1 priority may be in a range specific to an indication of a dynamic priority level.

In some solutions, an RSRP threshold may be determined in a sensing procedure based on an L1 priority. A WTRU may use one or multiple QoS parameters indicated by the L1 priority decoded during the sensing to compute an RSRP threshold value used for SL resource exclusion based on one or a combination of a pre-configuration or QoS parameters of the TB.

For example, a WTRU may be configured or preconfigured to use the priority indicated by the L1 priority indication for RSRP threshold computation. In another example, a WTRU may be configured or preconfigured to use the packet error rate parameter. A WTRU may compute an RSRP threshold value using such a QoS parameter indicated by the L1 priority decoded in the sensing procedure and the same QoS parameter of its own TB.

In some cases, a WTRU may be configured or preconfigured to use multiple QoS parameters corresponding to the L1 priority. For example, a WTRU may be configured or preconfigured to compute an RSRP threshold using both a priority and a packet error rate indicated by the decoded L1 priority. In another case, a WTRU may be configured or preconfigured to compute an RSRP threshold value based one or a combination of a priority, packet error rate, or a packet delay budget.

A WTRU may be configured or preconfigured with an RSRP threshold computation function. In addition, the computation function may be based on a resource type parameter of the L1 priority, such as a delay critical GBR, and may have a different function than a non-GBR resource type. One purpose may be, for example, to allow a TB of V2X service with Delay Critical GBR to have a higher probability of acquiring a resource in a Mode 2 operation. When multiple QoS parameters are applied in an RSRP threshold computation, the function may include different weight coefficients for each applied QoS parameter.

In some solutions, a WTRU may determine which QoS parameter or parameters are indicated by the decoded L1 priority to use for an RSRP threshold computation based on a corresponding QoS parameter of its own TB. For example, a WTRU may determine to use an indicated packet error rate parameter in an RSRP computation when its own TB has a high reliability—for instance, when the required packet error rate is below a pre-configured threshold. In another example, a WTRU may determine to use a packet delay budget parameter when its own TB is of low latency—for instance, when its packet delay budget is below a pre-configured threshold. In another example, a WTRU may determine to use a priority parameter when its own TB is of high priority—for instance, when its priority is above a pre-configured threshold.

In some solutions, a WTRU may use multiple QoS parameters with a weighting function, with for example, a highest weight applied to the most important QoS parameter of its own TB in the RSRP threshold value computation. For instance, a WTRU may apply a highest weight to the packet error rate or packet delay budget when its own TB is of high reliability or of low latency, respectively. This may allow for consideration of other QoS parameters indicated by the L1 priority.

In some solutions, a WTRU may determine an MCR requirement of a TB based on a decoded L1 priority. A WTRU may further determine a WTRU TX-RX distance based on TX location information, such as geographical information and/or a ZoneID, each of which may be transmitted in SCI. When the TX-RX distance is larger than the MCR requirement, a WTRU may disable HARQ feedback and/or CSI reporting.

In some solutions one or both of a TX/TX or a TX/RX prioritization may be based on an L1 priority. A WTRU may prioritize a transmission among multiple simultaneous transmissions or between simultaneous transmission and reception based on an L1 priority associated with each transmission and reception. In one solution, a WTRU may prioritize the transmission or reception associated with a TB of the highest priority indicated by the L1 priority.

In some solutions, a WTRU may apply multiple QoS parameters indicated by the L1 priority that are associated with the transmissions or receptions during TX/TX and/or TX/RX prioritization based on one or more of a pre-configuration or QoS parameters of the TB.

In some solutions, a WTRU may be configured or pre-configured to use a default priority level parameter indicated by the L1 priority to determine a PSFCH over which to perform transmissions when simultaneous PSFCH transmissions occur in the same slot. In another solution, a WTRU may be configured or preconfigured to use a packet latency budget parameter indicated by the L1 priority.

A WTRU may compare each QoS parameter indicated by the L1 priority in a configured or preconfigured order to determine the prioritization. In one solution, when an L1 priority includes a default priority level, a packet latency budget, and a packet error rate, a WTRU may be configured or preconfigured to prioritize transmissions in the order of the packet latency budget, packet error rate, and default priority level. For example, when a WTRU performs multiple PSFCH transmissions in one slot, a WTRU may determine to perform a PSFCH transmission associated with a TB with the lowest packet latency budget first. When the default latency budgets of the TBs are equal, a WTRU may perform a transmission over a PSFCH associated with a TB with the lowest packet error rate. When the packet error rates of the TBs are also equal, a WTRU may perform a transmission over PSFCH associated with TB with the highest default priority. In another example, a WTRU may follow the same prioritization to determine which TB to transmit first. In some solutions, a WTRU may be configured or preconfigured with a function based on all QoS parameters indicated by L1 priority to compute a prioritization value. A WTRU may prioritize the transmission or reception with the highest prioritization value.

In some solutions, a WTRU may apply one or multiple QoS parameters indicated by the L1 priority associated with a NR TB when the WTRU prioritizes transmission or reception between NR and LTE V2X transmissions. For example, a WTRU may use a default priority level parameter indicated by an L1 priority to compare with the LTE PPPP value in order to prioritize the transmission or reception.

Procedures by which a WTRU may receive control information are described herein. For one or more configured or preconfigured SL BWPs, a WTRU may determine a periodical set of time domain SL resources, for instance, slots. In each slot, a WTRU may attempt to receive control information including SCI and transmitted HARQ ACK/NACK feedback. A WTRU may determine a set of control information resources in a slot and attempt to receive control information associated with each control information resource.

In some solutions, a WTRU may receive a pre-emption indication instructing the WTRU, for example, to stop or temporarily pause transmission or reception. The WTRU may be configured or preconfigured with a set of dedicated pre-emption indication resources in which to receive the pre-emption indication, such as a dedicated resource pool, or a set of dedicated of sub-channels or PRBs. In another solution, a WTRU may determine a pre-emption indication reception resource in a slot based on the resource reserved for the PSSCH transmission that may be pre-empted. For example, a pre-emption indication resource may be in the same sub-channel as that of the PSCCH_1 SCI transmission associated with the PSSCH transmission to be pre-empted. In addition, the PRB index with the sub-channel may be based on WTRU identity information.

A WTRU may monitor and receive a pre-emption indication in the determined pre-emption indication resource in a slot when, for example, a WTRU has a standing resource reservation of a PSSCH transmission, and the WTRU determines the reserved PSSCH transmission may be subject to pre-emption. For example, the priority of the PSSCH transmission may be below a configured or preconfigured threshold. In another example, the time gap between the slot and the reserved PSSCH transmission slot may be larger than a pre-configured threshold. A WTRU may thus attempt to decode a configured or preconfigured PSCCH_1 SCI format, type, or size specific to a pre-emption indication in a pre-emption indication resource of the slot.

Solutions for determining a resource over which to receive a PSFCH transmission are described herein. In some solutions, a WTRU may determine a PSFCH reception resource in a slot, for example, including an index or indices of a symbol, sub-channel, or PRB, based on sub-channel index, WTRU ID or QoS parameter of the associated PSSCH transmission. Based on the PSFCH slot configuration of the resource pool, for instance, 1 PSFCH slot every among every 1, 2 or 4 slots, a WTRU may determine whether a PSFCH transmission may be expected in a slot with the help of the slot number. A WTRU may determine the sub-channel and PRB index or indices of the PSFCH based on the sub-channel and PRB allocation of the associated PSCCH_1 SCI and/or PSCCH_2 SCI transmission resource allocation. In some cases, a WTRU may determine the PSFCH sub-channel is the same as the sub-channel used for the associated PSCCH_2 SCI transmission. In other cases, a WTRU may determine the PSFCH PRB to be used based on the PSCCH_2 SCI transmission PRB allocation and/or the WTRU ID.

In some solutions, a WTRU may monitor and receive a PSFCH transmission in the determined PSFCH resource in a slot upon one or more conditions. For example, one condition may be when a WTRU has performed a PSSCH transmission with HARQ enabled. Another condition may be when the PSFCH transmission associated with the PSSCH transmission occurs in the slot according to the HARQ timeline.

In some solutions, a WTRU may attempt to decode a configured or preconfigured PSFCH format or type in the PSFCH reception resource of the slot.

Solutions directed to determination of resources for HARQ re-transmission are described herein. HARQ re-transmission may be performed, for example, if the WTRU indicates failure of reception of the initial transmission. In some solutions, a WTRU may determine a HARQ re-transmission resource in a slot based on the HARQ re-transmission resource reservation information received in the PSSCH_2 SCI of the initial transmission of the same TB. The WTRU may determine to receive a HARQ re-transmission when the slot aligns with the scheduled HARQ re-transmission timing information.

A WTRU may monitor and receive a HARQ re-transmission in a slot when, for example, a WTRU receives an initial transmission of a TB with HARQ enabled. According to the HARQ re-transmission resource reservation received in the initial transmission, the HARQ re-transmission may occur in the slot. A WTRU may attempt to decode a PSCCH, PSCCH_1, or PSCCH_2 SCI format, type, or size identical to that of the initial transmission of the same TB.

Solutions directed to resource determination for semi-persistent (SP)-based TBs when HARQ feedback and retransmission is enabled are disclosed herein. A WTRU may determine resources in a slot for an SP-based TB when HARQ feedback or retransmission is enabled based on an SP-based resource reservation. A WTRU may determine a resource or resources for the SP-based TB when HARQ is enabled are the same as a resource or resources used by a PSSCH transmission including the SP-based resource reservation information. A WTRU may monitor and receive a SP-based TB in a slot when a WTRU receives a PSSCH transmission that contains an SP-based resource reservation. According to the SP-based resource reservation received in the PSSCH transmission, a PSSCH transmission of another TB may occur in the slot. A WTRU may attempt to decode a PSCCH, PSCCH_1, or PSCCH_2 SCI format, type, or size identical to that of the last received TB of the same SP-base reservation.

Solutions directed to resource determination for semi-persistent (SP)-based TBs when HARQ feedback and retransmission is disable are disclosed herein. A WTRU may determine resources for an SP-based TB with HARQ feedback and re-transmission disabled. The WTRU may receive such a transmission in an identical way as described in paragraphs above. However, a WTRU may prioritize attempts to decode SCI in the SP-based TB for which HARQ is enabled. One benefit may be that a WTRU may ensure reception of all TBs requiring HARQ feedback transmission first, and that no unnecessary HARQ re-transmissions occur due to HARQ DTX.

Solutions directed to determining resources for high priority control information are described herein. A WTRU may determine resources for general control information that may include all sub-channels, PRBs, sub-carriers in a slot in which the WTRU does not expect any pre-scheduled transmissions but may expect transmission of TBs with QoS requirement exceeding a configured or preconfigured threshold. For example, a set of sub-channels, PRBs, or sub-carriers with the lowest indices in the resource pool may be configured or preconfigured for low-latency TB transmission that may require a WTRU to detect such transmission as early as possible.

Embodiments directed to general control information resources are disclosed herein. A WTRU may determine one or more general control information resources that may include all sub-channels, PRBs, or sub-carriers in a slot in which the WTRU does not expect any pre-scheduled transmissions but may expect transmission of TBs with QoS requirements below a configured or preconfigured threshold. A WTRU may perform a blind detection of SCI in the general reception resources.

Solutions directed to prioritization of SCI decoding by WTRUs are described herein. In some solutions, a WTRU may be configured or preconfigured to detect an SCI format, type, or size in each of the identified control information resources discussed above. Due to the WTRU processing capability, SL BWP bandwidths, and NR V2X QoS requirements, such as latency, there may be limits on how much control information a WTRU may decode in a given slot. Thus, a WTRU may be configured or preconfigured to prioritize SCI decoding based on the type of control information resource.

In some solutions, a WTRU may be configured or preconfigured to prioritize control information decoding based on the type of control information resource. For example, a WTRU may be configured or preconfigured to first receive control information that a WTRU may expect in the slot. A WTRU thus may attempt to decode control information in a PSFCH reception resource, a HARQ re-transmission resource, a resource for reception of an SP-based TB with HARQ enabled, a pre-emption indication resource, or resource for reception of an SP-based TB with HARQ disabled before processing the high priority control information resources and general control information resources. In another solution, a WTRU may be configured or preconfigured to prioritize all control information pertaining to HARQ mechanisms. Also, a WTRU may be configured or preconfigured to prioritize pre-emption indication resources and attempt to decode pre-emption indications first.

In another solution, a WTRU may be configured or preconfigured to attempt to decode control information based on a QoS parameter of the TB associated with the identified control information resource. For example, a WTRU may attempt to decode a PSFCH in a PSFCH reception resource before decoding a transmission on a HARQ re-transmission resource when the TB associated with the PSFCH has a higher priority than that associated with HARQ re-transmission. Also, a WTRU may be configured or preconfigured to apply prioritization based on both a type of control information resource and a QoS requirement associated with each control information.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method for Sidelink communication performed by a Wireless Transmit/Receive Unit (WTRU), the method comprising:
   selecting one or more sub-channels from a Physical Sidelink Shared Channel (PSSCH) in which to allocate time and frequency resources for a Physical Sidelink Control Channel (PSCCH), wherein the selection of the one or more sub-channels is based on at least one of a Sidelink Control Information (SCI) format, a traffic type, a WTRU identifier (ID), a Quality of Service (QOS) requirement, or Channel State Information (CSI) feedback;
   allocating the time and frequency resources within the PSCCH in which to transmit the SCI, wherein the allocation of time and frequency resources is based on at least one of the SCI format type, the traffic type, the WTRU ID, or the Quality of Service (QOS) requirement; and
   transmitting the SCI over the allocated time and frequency resources.

2. The method of claim 1, wherein the PSCCH is a first PSCCH, and the method further comprises transmitting the SCI over the first PSCCH and a second PSCCH.

3. The method of claim 2, wherein the transmission of the SCI over the first PSCCH and the second PSCCH is performed based on a QoS requirement.

4. The method of claim 2, further comprising selecting, based on an association of the first PSCCH and the second PSCCH, a sub-channel of the PSSCH in which to allocate time and frequency resources for the second PSCCH; and allocating second time and frequency resources within the PSCCH in which to transmit the SCI.

5. The method of claim 4, wherein the SCI transmitted over the first PSCCH includes an indication of the second time and frequency resources within the PSCCH.

6. The method of claim 1, wherein the allocation of the time and frequency resources within the selected sub-channels for transmitting the SCI is based on a priority value, and the method further comprises determining the priority value based on at least one of a 5G QoS Identifier (5QI) or a Minimum Communication Range (MCR) requirement.

7. The method of claim 6, further comprising prioritizing a plurality of transmissions based on the determined priority value.

8. The method of claim 2, wherein the SCI transmitted over the first PSCCH includes a portion of a WTRU ID, and the SCI transmitted over the second PSCCH includes indicating a respective remaining portion of the WTRU ID.

9. A Wireless Transmit/Receive Unit (WTRU) comprising:
   a transceiver; and
   a processor;
      the processor configured to select one or more sub-channels from a Physical Sidelink Shared Channel (PSSCH) in which to allocate time and frequency resources for a Physical Sidelink Control Channel (PSCCH), wherein the selection of the one or more sub-channels is based on at least one of a Sidelink Control Information (SCI) format, a traffic type, a WTRU identifier (ID), a Quality of Service (QOS) requirement, or Channel State Information (CSI) feedback;
      the processor further configured to allocate the time and frequency resources within the PSCCH in which to transmit the SCI, wherein the allocation of time and frequency resources is based on at least one of the SCI format type, the traffic type, the WTRU ID, or the Quality of Service (QOS) requirement; and
      the transceiver configured to transmit the SCI over the allocated time and frequency resources.

10. The WTRU of claim 9, wherein the PSCCH is a first PSCCH, and the transceiver is further configured to transmit the SCI over the first PSCCH and a second PSCCH.

11. The WTRU of claim 10, wherein the transceiver and the processor are further configured to transmit the SCI over the first PSCCH and the second PSCCH based on a QoS requirement.

12. The WTRU of claim 10, wherein the processor is further configured to: select, based on an association of the first PSCCH and the second PSCCH, a sub-channel of the PSSCH in which to allocate time and frequency resources for the second PSCCH; and allocate second time and frequency resources within the PSCCH in which to transmit the SCI.

13. The WTRU of claim 12, wherein the SCI transmitted over the first PSCCH includes an indication of the second time and frequency resources within the PSCCH.

14. The WTRU of claim 9, wherein the allocation of the time and frequency resources within the selected sub-channels for transmitting the SCI is based on a priority value, and the processor is further configured to determine the priority value based on at least one of a 5G QOS Identifier (5QI) or a Minimum Communication Range (MCR) requirement.

15. The WTRU of claim 14, wherein the processor is further configured to prioritize a plurality of transmissions based on the determined priority value.

16. The WTRU of claim 10, wherein the SCI transmitted over the first PSCCH includes a portion of a WTRU ID, and the SCI transmitted over the second PSCCH includes a respective remaining portion of the WTRU ID.

* * * * *